(12) United States Patent
Yin et al.

(10) Patent No.: US 11,852,377 B2
(45) Date of Patent: Dec. 26, 2023

(54) HIGH EFFICIENCY TANKLESS WATER HEATER

(71) Applicant: A. O. Smith Corporation, Milwaukee, WI (US)

(72) Inventors: Jianmin Yin, Pewaukee, WI (US); Stephen Memory, Menomonee Falls, WI (US); Chad Edington, Milwaukee, WI (US); Neil Rolph, Mt. Juliet, TN (US); Brian Iske, Murfreesboro, TN (US); Dustin Wiggins, Mt. Juliet, TN (US); Meng Yang, Nanjing (CN); Tingyu Li, Nanjing (CN)

(73) Assignee: A.O. Smith Corporation, Milwaukee, WI (US)

( * ) Notice: Subject to any disclaimer, the term of this patent is extended or adjusted under 35 U.S.C. 154(b) by 42 days.

(21) Appl. No.: 17/633,124

(22) PCT Filed: Aug. 6, 2020

(86) PCT No.: PCT/US2020/045291
§ 371 (c)(1),
(2) Date: Feb. 4, 2022

(87) PCT Pub. No.: WO2021/026397
PCT Pub. Date: Feb. 11, 2021

(65) Prior Publication Data
US 2022/0290894 A1 Sep. 15, 2022

Related U.S. Application Data

(60) Provisional application No. 62/883,869, filed on Aug. 7, 2019.

(51) Int. Cl.
*F22B 21/22* (2006.01)
*F22B 21/34* (2006.01)
(Continued)

(52) U.S. Cl.
CPC ............. *F24H 1/107* (2013.01); *F24H 8/006* (2013.01); *F28D 1/0472* (2013.01);
(Continued)

(58) Field of Classification Search
CPC ........ F24H 8/006; F28D 7/0075; F28D 7/024; F28D 9/0012; F28D 7/026;
(Continued)

(56) References Cited

U.S. PATENT DOCUMENTS 3,537,513 A 11/1970 Austin et al.
3,773,019 A * 11/1973 Hapgood .................. F22B 1/12
122/343
(Continued)

FOREIGN PATENT DOCUMENTS

CN 105466019 A 4/2016
CN 207379337 U 5/2018
DE 10026550 C1 11/2001

OTHER PUBLICATIONS

International Preliminary Report on Patentability for Application No. PCT/US2020/045291 dated Feb. 8, 2022 (8 pages).
(Continued)

*Primary Examiner* — Gregory A Wilson
(74) *Attorney, Agent, or Firm* — Michael Best & Friedrich LLP

(57) ABSTRACT

A water heater includes an outer casing defining a longitudinal axis, an axial direction being defined as extending along the longitudinal axis. The water heater further includes a combustor for production of hot flue gases, a primary heat exchanger including a tube positioned within the outer casing, and a secondary heat exchanger including a plurality of plates coupled together by brazing to form a brazed plate heat exchanger. The secondary heat exchanger includes a first set of passages defined between the plates, and a second
(Continued)

set of passages defined between the plates and alternating with the first set of passages in the axial direction. The primary and secondary heat exchangers are in fluid communication such that the flue gases flow through the second set of passages before being exhausted, and water to be heated flows through the first set of passages to a delivery point for use upon demand.

21 Claims, 15 Drawing Sheets

(51) Int. Cl.
| | |
|---|---|
| F24H 1/10 | (2022.01) |
| F24H 8/00 | (2022.01) |
| F28D 1/047 | (2006.01) |
| F28D 7/00 | (2006.01) |
| F28D 7/02 | (2006.01) |
| F28D 9/00 | (2006.01) |
| F28F 1/24 | (2006.01) |
| F28D 21/00 | (2006.01) |

(52) U.S. Cl.
CPC ........... *F28D 7/0075* (2013.01); *F28D 7/024* (2013.01); *F28D 9/0012* (2013.01); *F28F 1/24* (2013.01); *F28D 2021/0024* (2013.01); *F28F 2275/04* (2013.01)

(58) Field of Classification Search
CPC ........ F28D 21/0007; F28F 1/24; F22B 27/00; F22B 35/005; F22B 21/24; F22B 21/26; F22B 21/28; F22B 21/22; F22B 21/34; B01J 2219/00074
See application file for complete search history.

(56) References Cited

U.S. PATENT DOCUMENTS

| | | | | |
|---|---|---|---|---|
| 4,114,686 A | * | 9/1978 | Mueller | .................. F25B 39/04 165/110 |
| 4,222,350 A | | 9/1980 | Pompei et al. | |
| 4,893,672 A | | 1/1990 | Bader | |
| 5,067,330 A | * | 11/1991 | Cook | ...................... F25B 33/00 62/476 |
| 5,405,261 A | * | 4/1995 | Scraggs | ..................... F23G 7/05 126/110 R |
| 5,687,678 A | * | 11/1997 | Suchomel | ............... F28D 7/024 122/249 |
| 7,019,412 B2 | * | 3/2006 | Ruggieri | ............... F01K 25/065 60/673 |
| 7,069,980 B2 | * | 7/2006 | Hofbauer | ................ F28F 1/022 165/150 |
| 7,258,080 B2 | * | 8/2007 | Missoum | ................ F24H 1/205 122/18.31 |
| 7,647,897 B2 | * | 1/2010 | Ootomo | .................... F24H 1/40 122/31.1 |
| 8,015,950 B2 | * | 9/2011 | Okamoto | .................. F24H 1/48 122/31.1 |
| 8,122,855 B2 | | 2/2012 | Klausmann et al. | |
| 8,347,826 B2 | * | 1/2013 | Amada | ..................... F24H 1/43 165/184 |
| 8,418,661 B2 | * | 4/2013 | Kanda | ..................... F23N 1/022 431/12 |
| 9,546,798 B2 | * | 1/2017 | Deivasigamani | ......... F24H 1/44 |
| 9,939,172 B2 | | 4/2018 | Qiu et al. | |
| 2004/0194934 A1 | | 10/2004 | Hofbauer | |
| 2005/0224070 A1 | | 10/2005 | Hanai et al. | |
| 2008/0061160 A1 | | 3/2008 | Ootomo | |
| 2015/0007779 A1 | | 1/2015 | Cui | |
| 2016/0116228 A1 | | 4/2016 | Huang et al. | |

OTHER PUBLICATIONS

International Search Report and Written Opinion for Application No. PCT/US2020/045291 dated Nov. 19, 2020 (15 pages).
Lochinvar. Water Heater Product Line Brochure. Available online at least as early as Jul. 17, 2018. http://www.lochinvar.com/_downloads/WaterHeaterBrochure.pdf (52 pages).
PVI. EZ Plate Semi-Instantaneous Brochure. PV 8659. Available online at least as early as Jul. 17, 2018. http://www.pvi.com/pdf%20files/EZ%20Plate%20Semi-Instantaneous%20Brochure.pdf. (8 pages).

* cited by examiner

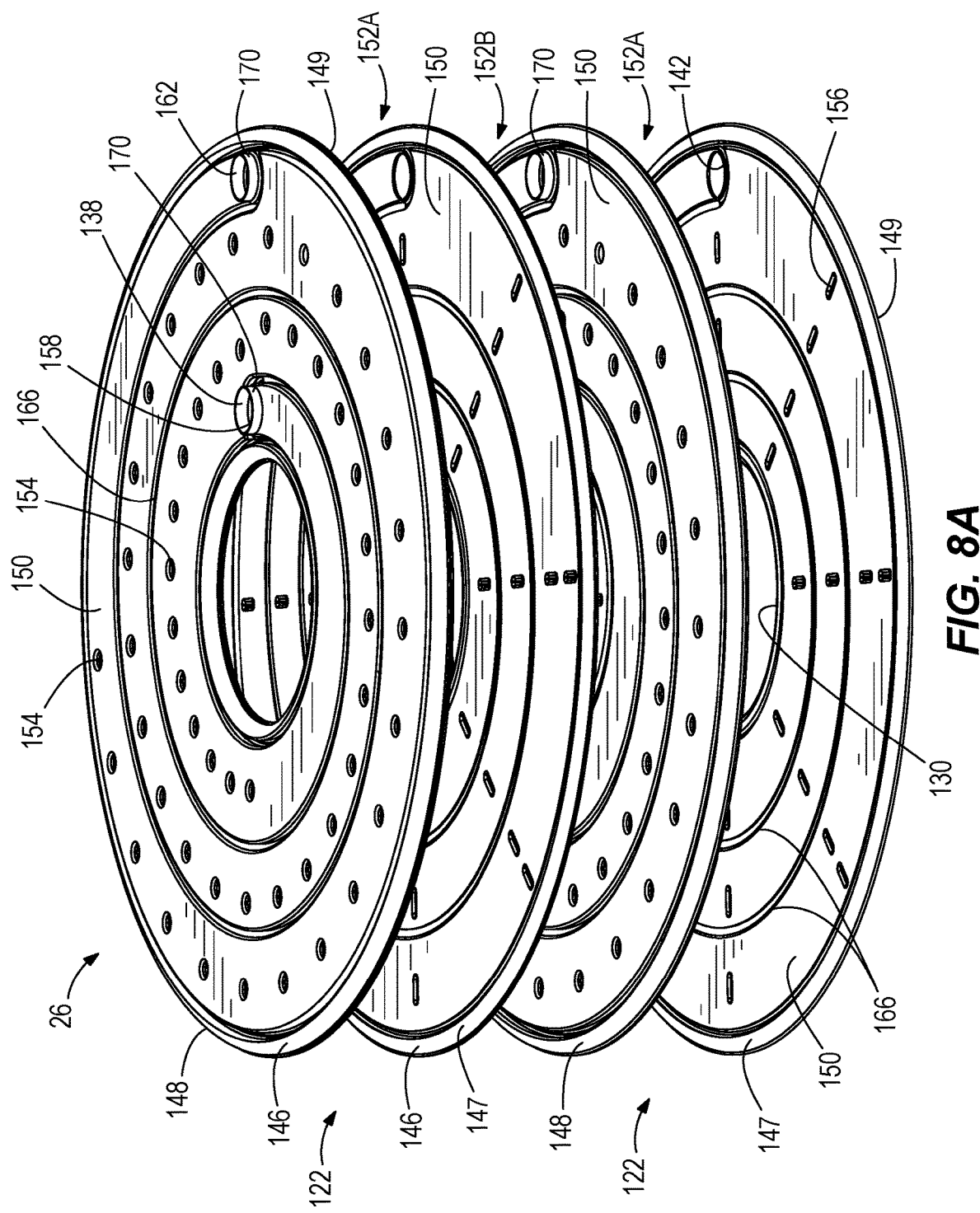

HIGH EFFICIENCY TANKLESS WATER HEATER

BACKGROUND

Generally, water heaters fall into one of two types: (i) tankless or instantaneous water heaters, and (ii) storage or tank water heaters. Each type of water heater has its advantages and disadvantages, and the decision to use one over the other for a particular application involves trade-offs in various performance issues. The present invention relates to a water heater that takes advantage of beneficial aspects of tankless water heater types.

SUMMARY

In one embodiment, the invention provides a water heater comprising: an outer casing defining a longitudinal axis, an axial direction being defined as extending along the longitudinal axis; a combustor for production of hot flue gases; a primary heat exchanger including a tube positioned within the outer casing; and a secondary heat exchanger including a plurality of plates coupled together by brazing to form a brazed plate heat exchanger, the secondary heat exchanger including a first set of passages defined between the plates and a second set of passages defined between the plates and alternating with the first set of passages in the axial direction; wherein the primary heat exchanger and the secondary heat exchanger are in fluid communication such that the flue gases flow from the combustor then through the primary heat exchanger and then through the second set of passages before being exhausted, and water to be heated flows through the first set of passages then through the tube and then to a delivery point for use upon demand.

In some embodiments, the secondary heat exchanger includes a spiral flow path, and wherein the water is configured to be directed along the spiral flow path. In some embodiments, the spiral flow path is formed by a coupling member extending axially between adjacent plates, and wherein at least one of the passages of the first set of passages includes the coupling member. In some embodiments, the spiral flow path is formed by a coupling member spiraling from a first end to a second end of each plate to form the spiral flow path. In some embodiments, the plates define a water inlet manifold positioned at one of the first end and the second end, wherein the plates define a water outlet manifold positioned at the other of the first end and the second end, and wherein the water is directed from the water inlet manifold along the spiral flow path to the water outlet manifold. In some embodiments, the plates define an exhaust manifold, and wherein the flue gases flow through the second set of passages in a radial direction perpendicular to the axial direction toward the exhaust manifold. In some embodiments, the plates form a funnel for directing condensation formed within the plates to a condensate drain. In some embodiments, the water and the flue gases flow through the secondary heat exchanger in a cross-counter flow. In some embodiments, the water heater further comprises an exhaust in fluid communication with the primary heat exchanger and the secondary heat exchanger, and a fan for directing the flue gases first through the primary heat exchanger and the secondary heat exchanger, and then through the exhaust. In some embodiments, the plates define a water outlet manifold, wherein the tube includes a water inlet and a water outlet, and wherein the water inlet is fluidly connected to the water outlet manifold. In some embodiments, the tube coils about the longitudinal axis within the outer casing thereby forming a plurality of gaps between adjacent sections of the tube, and wherein the primary heat exchanger includes a conduit within at least one of the gaps. In some embodiments, the tube coils about the longitudinal axis within the outer casing thereby forming a cavity, and the combustor includes a cylindrical combustion surface, the cylindrical combustion surface positioned within the cavity. In some embodiments, a portion of the tube of the primary heat exchanger doubles back on itself to define a first coil section and a second coil section that is spaced radially further from the longitudinal axis than the first coil section. In some embodiments, the secondary heat exchanger is positioned at least partially within the primary heat exchanger such that at least a portion of the tube coils about the plates. In some embodiments, the tube of the primary heat exchanger includes external heat exchange fins and the external heat exchanger fins facing radially inwardly around the secondary heat exchanger are squared to provide a cylindrical cavity to closely fit around the secondary heat exchanger.

In another embodiment, the invention provides a method of heating water, comprising: providing an outer casing and a primary heat exchanger including a tube positioned within the outer casing, wherein the outer casing defines a longitudinal axis, an axial direction being defined as extending along the longitudinal axis; providing a secondary heat exchanger including a plurality of plates coupled together by brazing to form a brazed plate heat exchanger, the plates defining a first set of passages configured to receive water and a second set of passages configured to receive hot flue gases, the second set of passages alternating with the first set of passages in the axial direction; producing the hot flue gases; moving the flue gases first through the primary heat exchanger and then through the second set of passages; flowing water to be heated first through the first set of passages, then into the tube, and then out of the water heater for use upon demand; heating the water in the tube as the flue gases flow through the primary heat exchanger; and heating the water flowing along the first set of passages as the flue gases flow along the second set of passages.

In some embodiments, the first set of passages of the secondary heat exchanger includes a spiral flow path, and wherein the water is configured to be directed along the spiral flow path. In some embodiments, the spiral flow path is formed by a coupling member extending axially between at least some of the plates, the coupling member spiraling from a first end to a second end of the at least some of the plates to form the spiral flow path, and wherein the water to be heated flows through the first set of passages from one of the first end and the second end along the spiral flow path to the other of the first end and the second end. In some embodiments, the plates define an inlet manifold positioned at one of the first end and the second end, and wherein the plates define an outlet manifold positioned at the other of the first end and the second end. In some embodiments, the plates define an exhaust manifold, wherein the flue gases flow through the second set of passages in a radial direction perpendicular to the axial direction toward the exhaust manifold. In some embodiments, the method further comprises positioning the secondary heat exchanger at least partially within the primary heat exchanger such that at least a portion of the tube coils about the plates. In some embodiments, the method further comprises providing external heat exchange fins on the tube of the primary heat exchanger and squaring portions of the external heat exchange fins facing radially inwardly around the secondary heat exchanger to provide a cylindrical cavity to closely fit around the secondary heat exchanger.

In another embodiment, the invention provides a heat exchanger comprising: a plurality of plates stacked on top of each other, the plates defining a longitudinal axis extending through the plates, an axial direction defined as extending along the longitudinal axis, the plates coupled together by brazing to form a brazed plate heat exchanger, an inlet manifold and an outlet manifold defined by the plates, the inlet manifold and the outlet manifold configured to receive a first fluid; an exhaust manifold defined by the plates, the exhaust manifold configured to receive a second fluid; a first set of passages defined between the plates, the first set of passages in fluid communication with the inlet and outlet manifolds; and a second set of passages defined between the plates, the second set of passages in fluid communication with the exhaust manifold, wherein the second set of passages alternate with the first set of passages in the axial direction, wherein a spiral flow path is formed by a coupling member extending axially between two adjacent plates, wherein the coupling member is positioned within each of the first set of passages, and wherein the first fluid is directed from the inlet manifold through the first set of passages along the spiral flow path to the outlet manifold as the second fluid is directed through the second set of passages to the exhaust manifold.

BRIEF DESCRIPTION OF THE DRAWINGS

FIG. 8A is a top perspective exploded view of a plurality of plates that form a portion of the secondary heat exchanger of FIG. 5, illustrating a top side of each of the plates.

DETAILED DESCRIPTION

Figure 1:
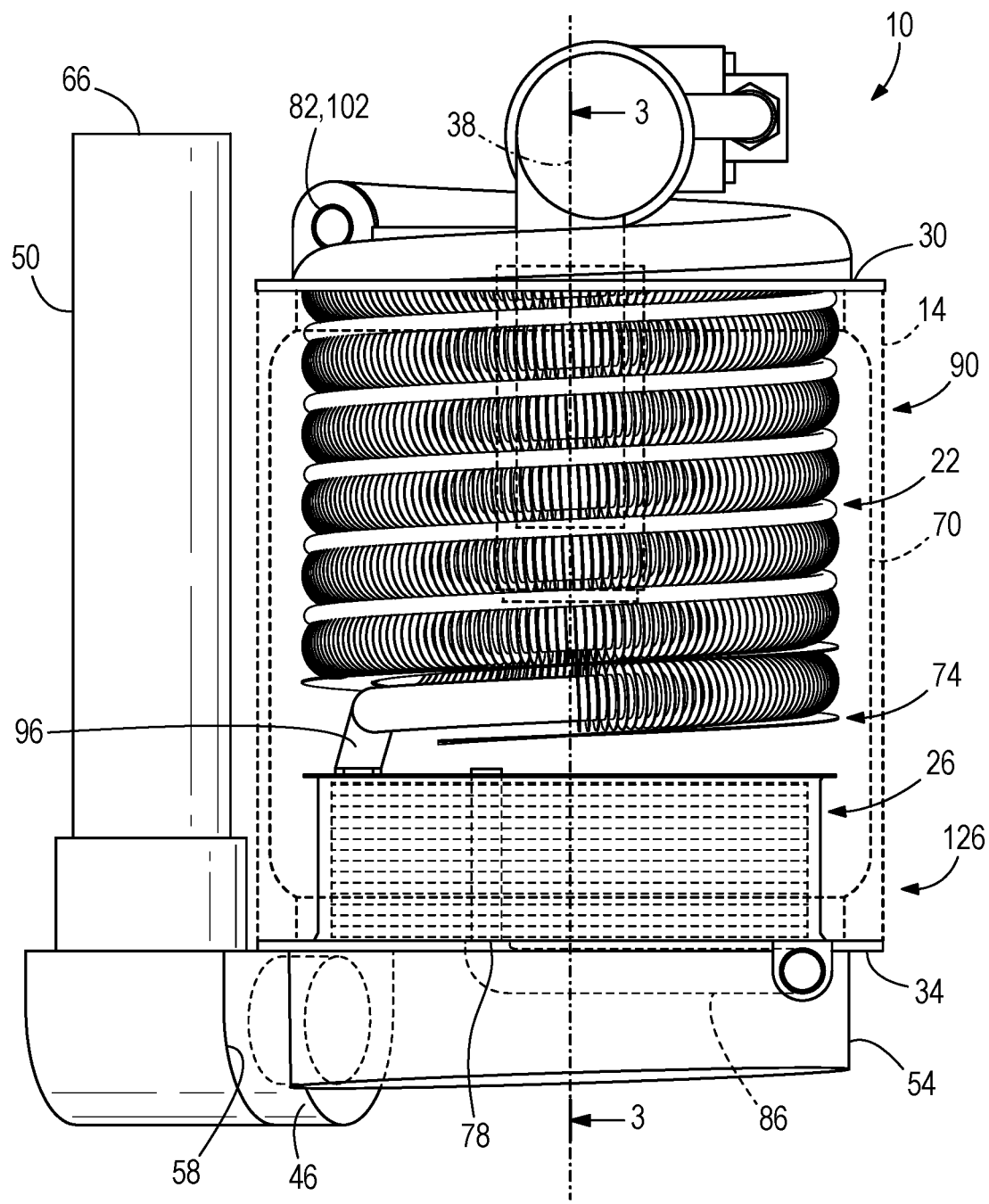
FIG. 1 is a side view of a water heater according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIGS. 1-9 illustrate a high efficiency, tankless water heater 10 (also called an "instantaneous water heater" by some in the industry) including an outer casing 14, a flue assembly 18, a primary heat exchanger 22, and a secondary heat exchanger 26. The heat exchangers 22, 26 are fluidly connected to each other. Each heat exchanger 22, 26 is not configured to store water within a tank such that the primary heat exchanger and the secondary heat exchanger 26 form the tankless water heater 10.

Figure 2:
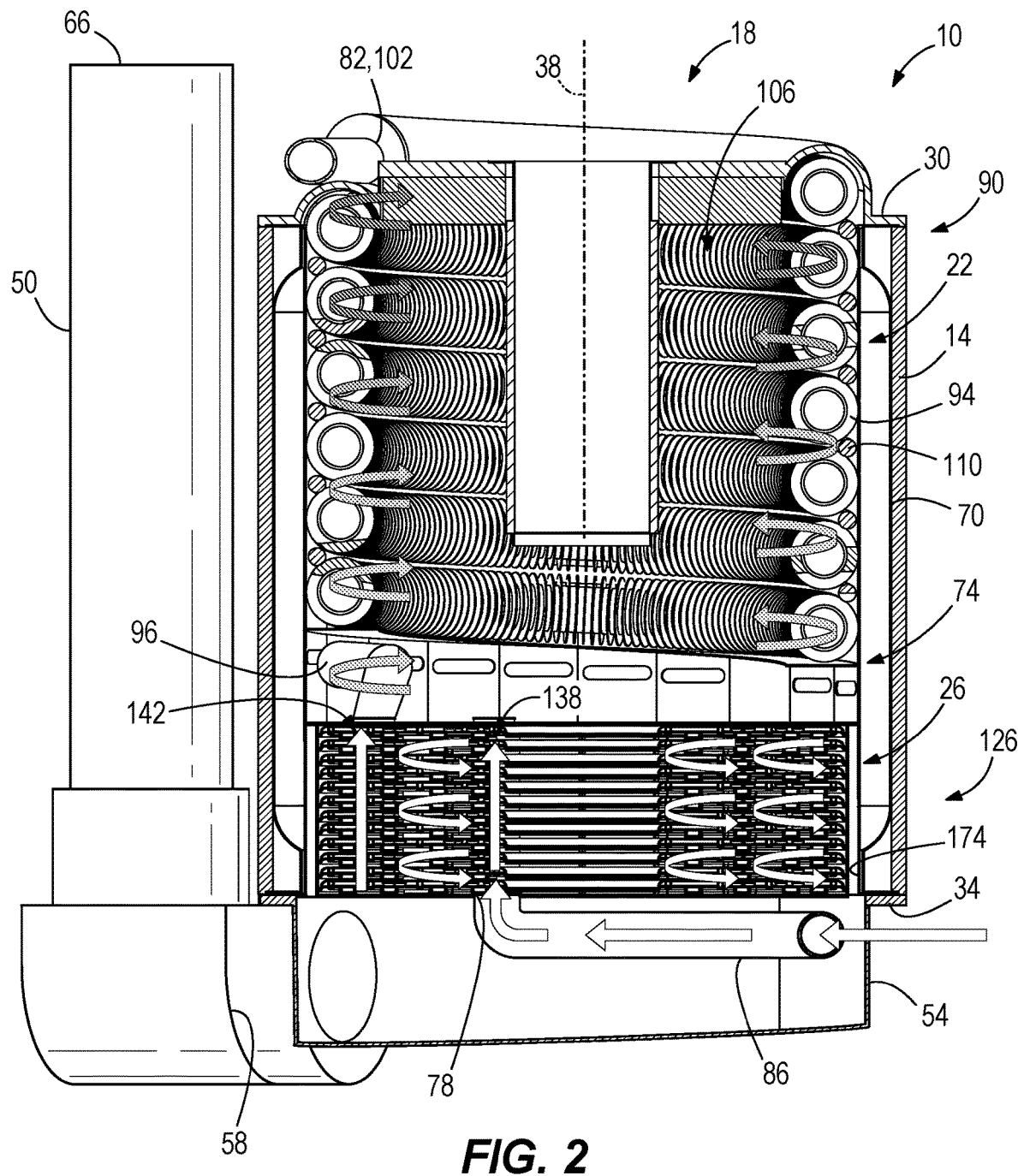
FIG. 2 is a side cross-sectional view of the water heater taken along line 2-2 in FIG. 3, illustrating a water flow path through the water heater.
Figure 3:
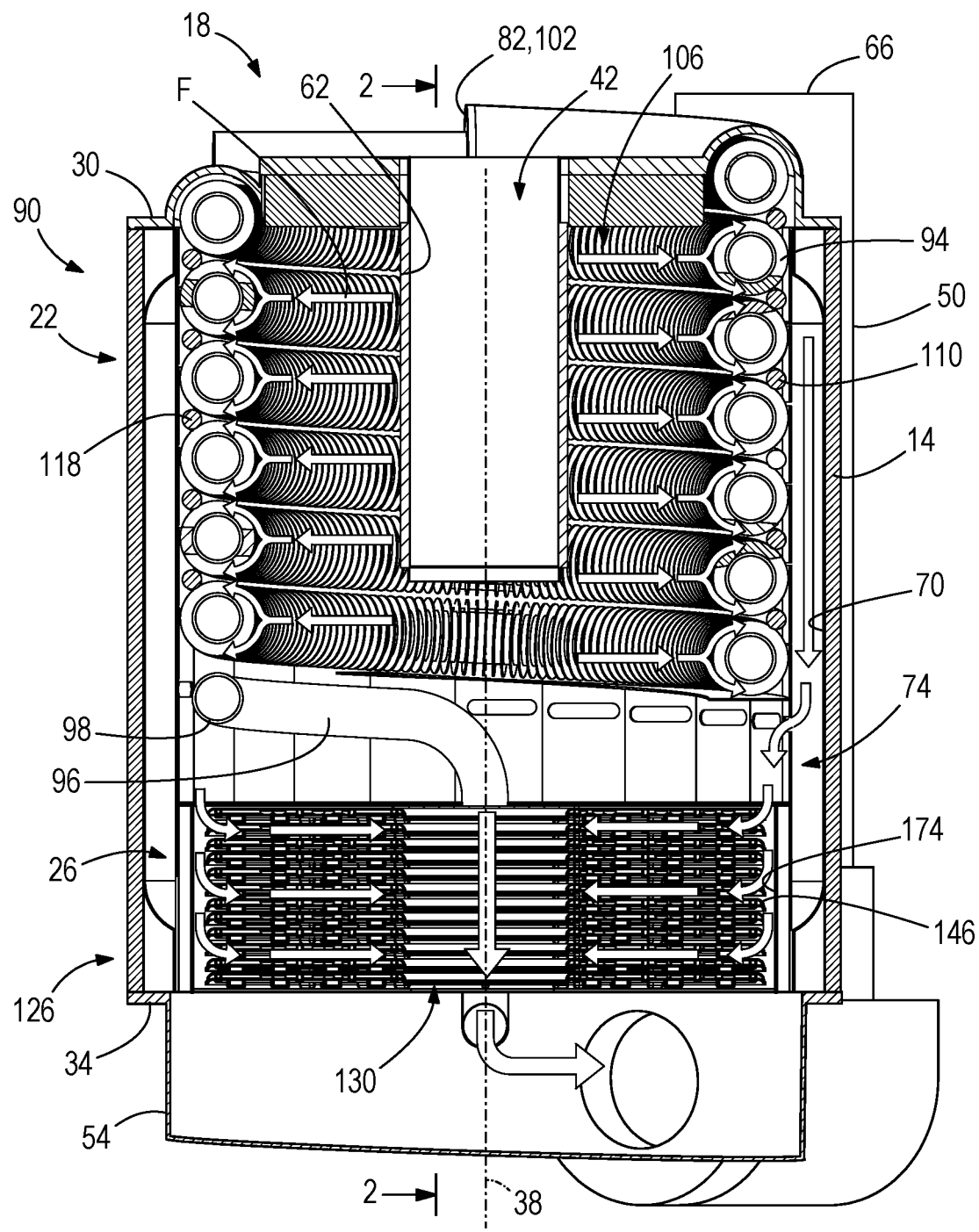
FIG. 3 is a side cross-sectional view of the water heater taken along line 3-3 in FIG. 1, illustrating a flue gas flow path through the water heater.

With reference to FIGS. 2-3, the outer casing 14 has a generally cylindrical shape extending between a first end 30 and a second end 34. The water heater 10 includes a longitudinal axis 38 defined by the outer casing 14 and extending through the first and second ends 30, 34. An axial direction of the water heater 10 is defined as extending along the longitudinal axis 38. The illustrated water heater 10 is configured with the longitudinal axis 38 being vertical, and as a result, the first and second ends 30, 34 can be referred to as the respective top and bottom of the outer casing 14. In addition, the outer casing 14 defines an interior space 74 configured to receive the first and second heat exchangers 22, 26.

With reference to FIGS. 1-3, the flue assembly 18 includes a combustor 42, a fan housing 46, a flue 50, and a base 54. The illustrated combustor 42 is positioned adjacent (i.e., on top of) the first end 30 of the outer casing 14. Furthermore, the illustrated fan housing 46 is positioned adjacent the base 54, and a bottom side 58 of the flue 50 is positioned adjacent the fan housing 46. In other embodiments, a fan of the fan housing 46 may be positioned within the base 54, the flue 50, or the outer casing 14. The flue 50 is shown separate from the outer casing 14; however, in other embodiments, the flue 50 may form a portion of the outer casing 14. The outer casing 14, the base 54, and the flue 50 are in fluid communication with each other.

With reference to FIG. 1, the combustor 42 is mounted on top of the water heater 10 and may be inside the outer casing 14. A portion of the combustor 42 may be outside the outer casing 14. The combustor 42 includes, among other things, a cylindrical combustion surface 62 (FIG. 1) extending from the first end 30 toward the second end 34 within the outer casing 14. The illustrated combustion surface 62 extends along the longitudinal axis 38. In particular, the combustion surface 62 is positioned within the primary heat exchanger 22, as further discussed below. The combustor 42 produces hot flue gases F (FIG. 9) from a mixture of air and fuel.

The fan in the fan housing 46 is configured as a draft inducer. The fan pulls flue gases F that have been produced by the combustor 42 through the primary and secondary heat exchangers 22, 26 within the outer casing 14 and the base 54, and forces the flue gases up through the flue 50 through the exhaust 66.

The flue 50 may include an exhaust structure or stack that extends upwardly parallel to the outer casing 14 (FIG. 1). The flue gases F may be sufficiently cooled to a lower temperature (i.e., to a temperature below 120 degrees Fahrenheit approximately) within the primary and secondary heat exchangers 22, 26 before being exhausted to the flue 50. As such, the stack at least partially defines a lowest temperature zone in the water heater 10.

The base 54 is positioned below the second end 34 of the outer casing 14. In the illustrated embodiment, the base 54 is configured to support the water heater 10. In other embodiments, the base 54 may be formed integrally with the outer casing 14 and may or may not be part of the flue assembly 18.

With continued reference to FIGS. 1-3, the water heater 10 includes a housing 70 positioned within the outer casing 14. The illustrated housing 70 is positioned within the interior space 74. In addition, the housing 70 surrounds the primary heat exchanger 22 and the secondary heat exchanger 26. In other embodiments, the water heater 10 may not include the housing 70.

With reference to FIGS. 1 and 2, the water heater 10 includes a cold water inlet 78 and a hot water outlet 82. In the illustrated embodiment, the cold water inlet 78 is positioned at the second end 34 of the outer casing 14. A cold water pipe 86 delivers cold water from a water source (e.g., municipal supply) to the cold water inlet 78. Heat is transferred from the flue gases F to the water in the primary and secondary heat exchangers 22, 26 as the water flows from the inlet 78 to the outlet 82. The heated water exits the water heater 10 at the hot water outlet 82 and is delivered to a user at a water delivery point (e.g., faucet), usually via a hot water pipe.

Figure 4:
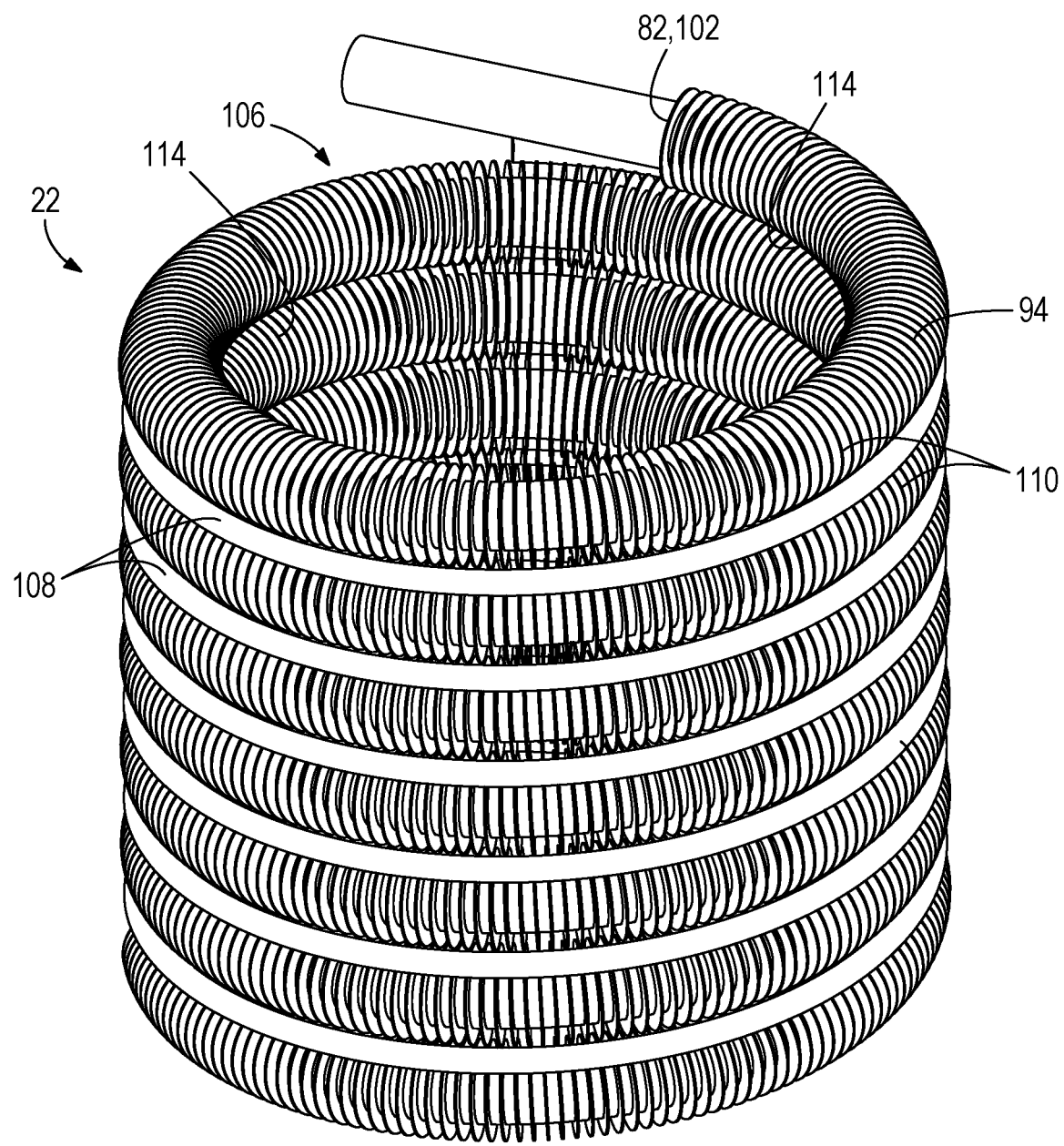
FIG. 4 is a perspective view of a primary heat exchanger of the water heater of FIG. 1.
Figure 5:
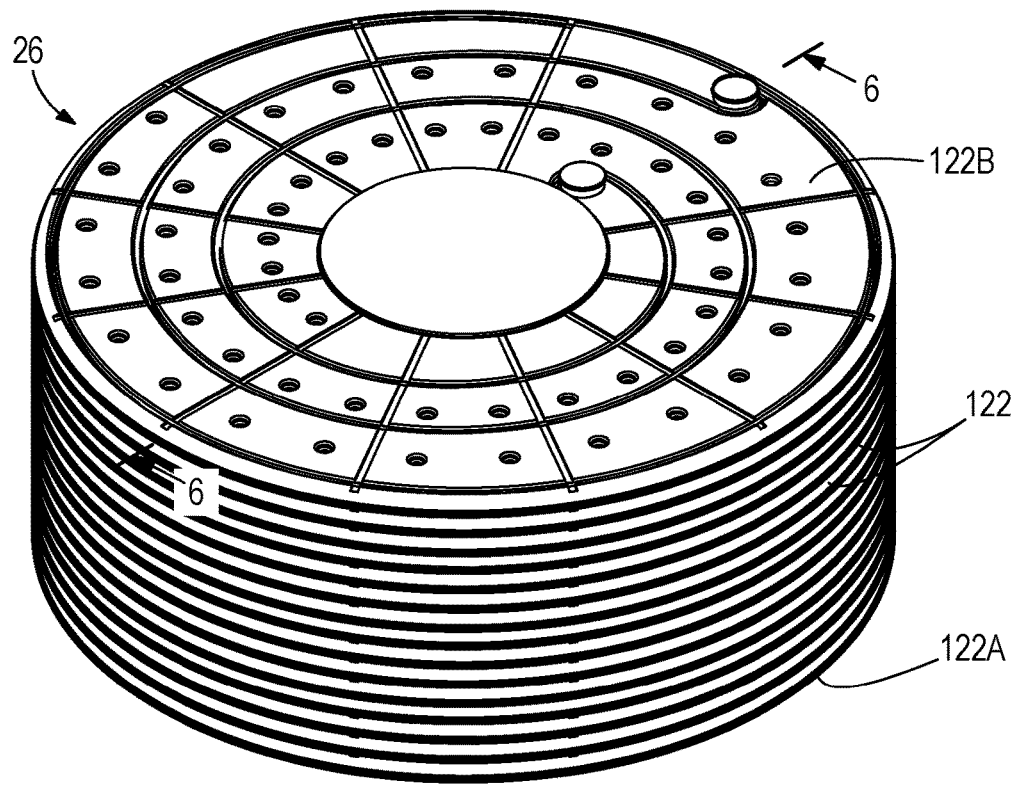
FIG. 5 is a perspective view of a secondary heat exchanger of the water heater of FIG. 1.

With reference to FIGS. 2-4, the illustrated primary heat exchanger 22 is at least partially positioned within an upper portion 90 of the interior space 74 defined by the outer casing 14. Furthermore, in the illustrated embodiment, the primary heat exchanger includes a single finned tube 94. The tube 94 coils about the longitudinal axis 38 within the outer casing from a primary water inlet 98 (FIG. 3) to a primary water outlet 102, and defines a primary cavity 106 within the coil (i.e., the primary cavity 106 is radially inward of the tube 94 within the outer casing 14). The illustrated primary cavity 106 is positioned within the upper portion 90 of the interior space 74. The primary cavity 106 is configured to receive the flue gases F (i.e., products of combustion) from the combustor 42, as described below.

The primary water outlet 102 is the hot water outlet 82 of the water heater 10. In other embodiments, the primary heat exchanger 22 may include two or more tubes 94, each tube 94 coiling about the longitudinal axis 38. In such alternative configurations, each tube may include a flow control valve in order to provide adequate water flow through each tube. In addition, the primary heat exchanger 22 may further include inlet and outlet manifolds positioned at the primary water inlet 98 and primary water outlet 102, respectively.

The tube(s) 94 is adapted for the flow of water therethrough from the primary water inlet 98 to the primary water outlet 102. More specifically, water flows upwardly relative to the axial direction from the primary water inlet 98 to the primary water outlet 102 (i.e., hot water outlet). The primary water inlet 98 is fluidly connected to the secondary heat exchanger 26 via an intermediate tube 96.

With reference to FIGS. 2-3, the combustor 42 is positioned on the longitudinal axis 38 within the primary cavity 106. As such, the coiling tube(s) 94 coils about the combustor 42 (i.e., the cylindrical combustion surface 62). In particular, the tube(s) 94 is spaced radially outward from the combustor 42 relative to the longitudinal axis 38. In addition, the outer casing 14 and the housing 70 surrounds the combustor and the tube(s) 94. The flue gases F produced by the combustor flow through the primary cavity 106 and past the tube(s) 94 toward the outer casing 14 for heating the water flowing through the tube(s) 94.

With continued reference to FIGS. 3-4, the primary heat exchanger 22 further includes a baffle 108. In the illustrated embodiment, the baffle 108 coils about the longitudinal axis 38 within a plurality of gaps 114 (FIG. 4) formed between adjacent sections of the coiling tube(s) 94. In particular, the baffle 108 coils relative to the tube(s) 94 such that the baffle 108 is positioned within the gaps 114. In other embodiments, the baffle 108 may be formed by a plurality of distinct members, in which each member is separately positioned within each gap 114. The baffle 108 is configured to re-direct the flue gases F toward the tube(s) 94 as the flue gases F flow past the tube(s) 94 toward the outer casing 14 to increase heat transfer between the flue gases F and the water within the primary heat exchanger 22.

With reference to FIG. 4, the primary heat exchanger 22 further includes a plurality of heat exchange members or fins 110. In the illustrated embodiment, each of the fins 110 is formed by a plate-shaped member. Each fin 110 is coupled to and extends radially from an outer surface of the tube(s) 94. The illustrated fins 110 are formed of stainless steel and are laser welded to the tube(s) 94. The fins 110 are configured to increase a surface area of the tube(s) 94 thereby lowering a heat flux and increasing heat transfer between the flue gases F and the water within the primary heat exchanger 22.

Figure 12:
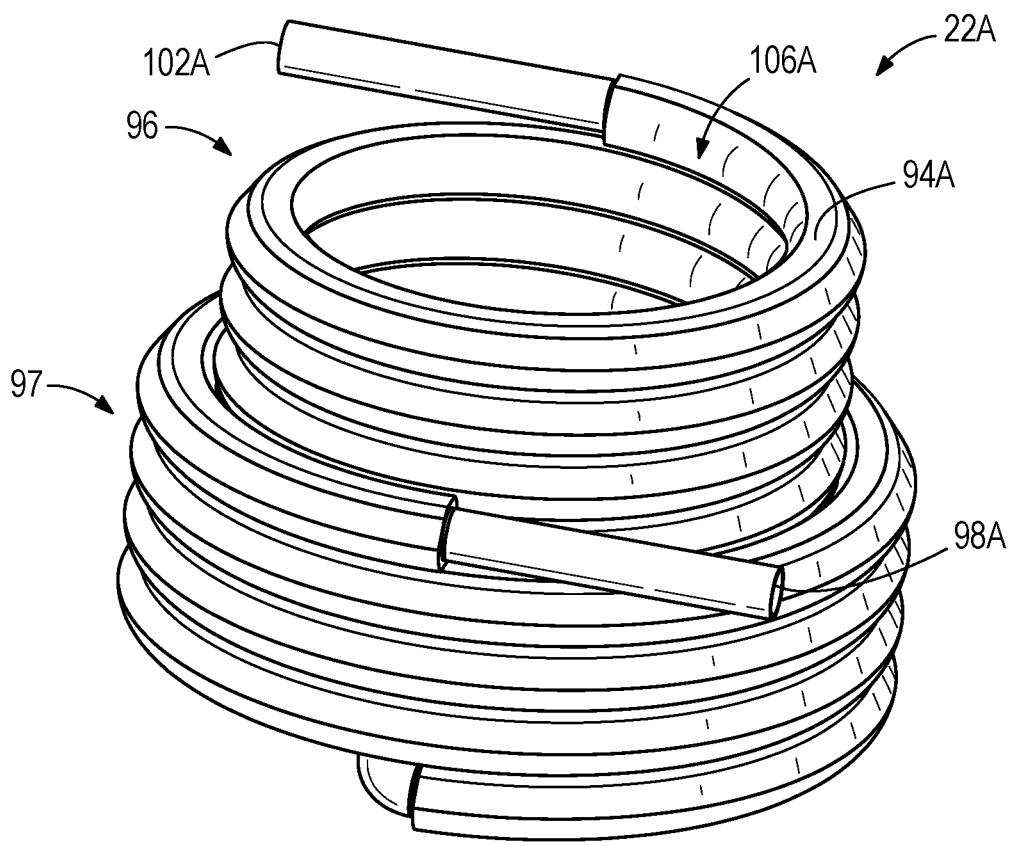
FIG. 12 is a perspective view of another primary heat exchanger embodying the invention.
Figure 13:
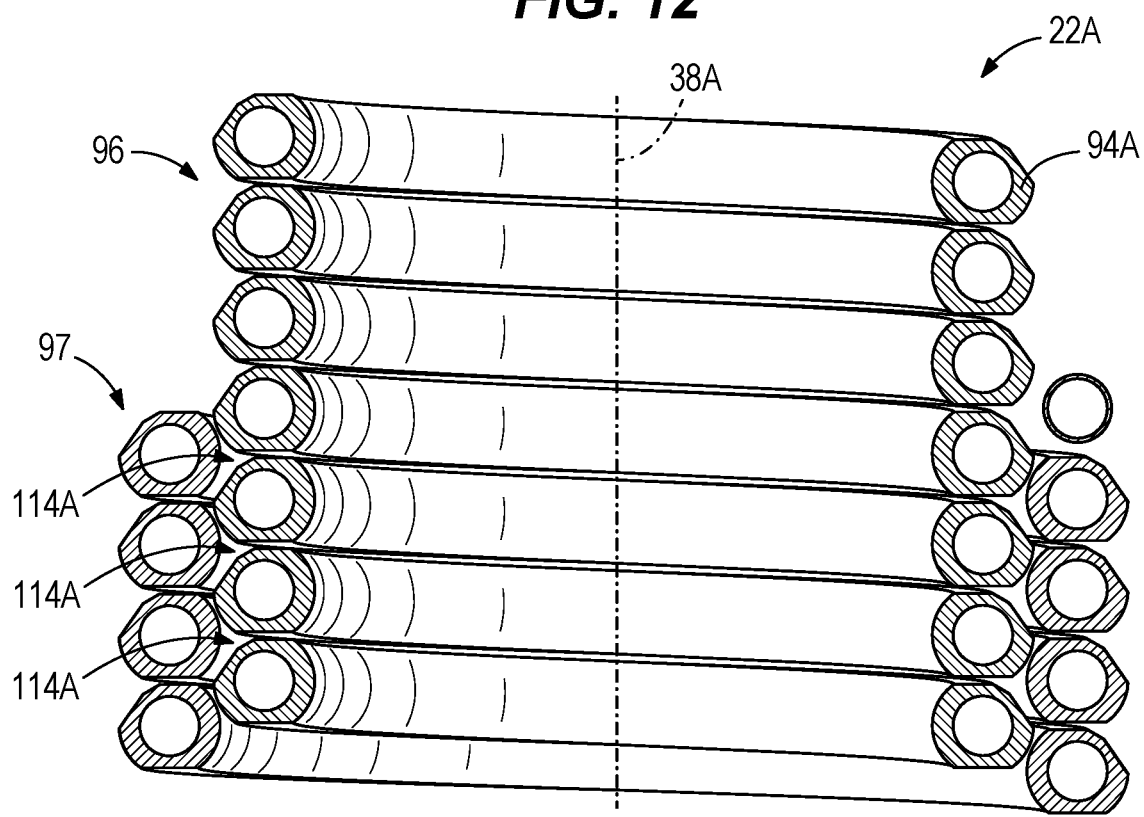
FIG. 13 is a cross-sectional view of the primary heat exchanger of FIG. 12.

FIGS. 12 and 13 illustrate another primary heat exchanger 22A embodying the invention. In this alternative embodiment, like elements as the primary heat exchanger 22 of the first embodiment (FIGS. 1-9) have been given the same reference numbers plus a letter "A." The primary heat exchanger 22A includes a single tube 94A that coils about longitudinal axis 38A (FIG. 13) from a primary water inlet 98A to a primary water outlet 102A, and defines a primary cavity 106A within the coil (i.e., the primary cavity 106A is radially inward of the tube 94A). Specifically, in this alternative embodiment, the tube 94A doubles back on itself near a bottom of the primary heat exchanger 22A such that the tube 94A includes a first coil section 96 and a second coil section 97 that is spaced radially further from the longitudinal axis 38A than the first coil section 96. Similar to the baffle 108 of the first embodiment, the coils of the second coil section 97 are positioned within gaps 114A defined by adjacent sections of the first coil section 96. In the illustrated configuration, the coils of the second coil section 97 are positioned in only some of the gaps 114A defined by the coils of the first coil section 96. In other configurations, the coils of the second coil section 97 may be positioned in all of the gaps 114A defined by the coils of the first coil section 96.

The second coil section 97 is configured to increase a surface area of the tube 94A in contact with the flue gases F for increasing heat transfer between the flue gases F and the water within the primary heat exchanger 22. Water flows from the primary water inlet 98A, through the second coil section 97, then through the first coil section 96, to the primary water outlet 102A. Therefore, in this configuration of the primary heat exchanger 22A, the water flows radially downward relative to the longitudinal axis 38A from the primary water inlet 98A, before the water flows radially upward to the primary water outlet 102A.

Referring now to FIGS. 5-9, the secondary heat exchanger 26 is a brazed plate heat exchanger. Specifically, the secondary heat exchanger 26 includes a plurality of plates 122 coupled together by brazing. In the illustrated embodiment, the plates 122 are stacked on top of each other in the axial direction. As such, the longitudinal axis 38 extends through the plates 122. The illustrated plates 122 have a circular shape, and are formed by stainless steel. Copper cladding is further provided on the stainless steel. The copper cladding may be used for brazing purposes to strengthen the coupling between the plates 122. In other embodiments, other types of cladding may be used such as nickel cladding. Furthermore, in other embodiments, the plates 122 may have a different shape such as rectangular, pentagonal, etc. and/or a different size (e.g., larger or smaller diameter), and may be formed by other materials having high thermal conductivity. The secondary heat exchanger 26 is positioned in a lower portion 126 of the interior space 74 (FIG. 2). The secondary heat exchanger 26 is configured to guide the water and the flue gases F between the plates 122 to and from respective exhaust manifold 130, water inlet manifold 138, and water outlet manifold 142 (FIG. 6), as further discussed below.

Figure 6:
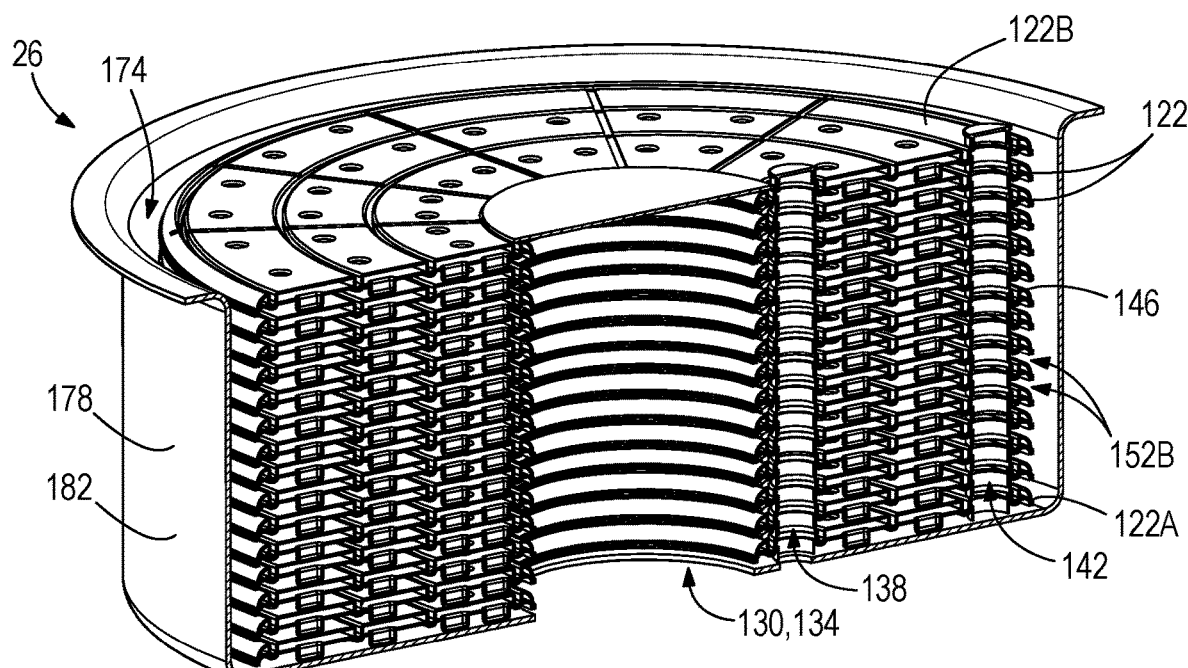
FIG. 6 is a perspective cross-sectional view of the secondary heat exchanger taken along line 6-6 in FIG. 5.

With reference to FIG. 6, the secondary heat exchanger 26 includes an exhaust manifold 130. Specifically, the stacked plates 122 include a series of axially-aligned holes defining a secondary cavity 134. As such, the secondary cavity 134 extends through the plates 122 along the axial direction to form the exhaust manifold 130. In the illustrated embodiment, as shown in FIG. 3, the exhaust manifold 130 is centered on the longitudinal axis 38. In other words, the secondary cavity 134 extends through a center of each of the plates 122. In other embodiments, the exhaust manifold 130 may be defined by the plates 122 at other radial positions. The exhaust manifold 130 is configured to receive the flue gases F.

With continued reference to FIG. 6, the secondary heat exchanger 26 includes a water inlet manifold 138 and a water outlet manifold 142, each of which is defined by a series of axially-aligned holes in the stacked plates 122. The illustrated inlet manifold 138 is radially-outward and adjacent to the exhaust manifold 130 and the illustrated water outlet manifold 142 is spaced radially outward further from the longitudinal axis 38 (i.e., adjacent an outer edge 146 of each of the plates 122). In other embodiments, the water inlet manifold 138 and water outlet manifold 142 may be at other radial positions. The water inlet manifold 138 and water outlet manifold 142 are configured to collect the water at the inlet and the outlet of the secondary heat exchanger 26.

Figure 9:
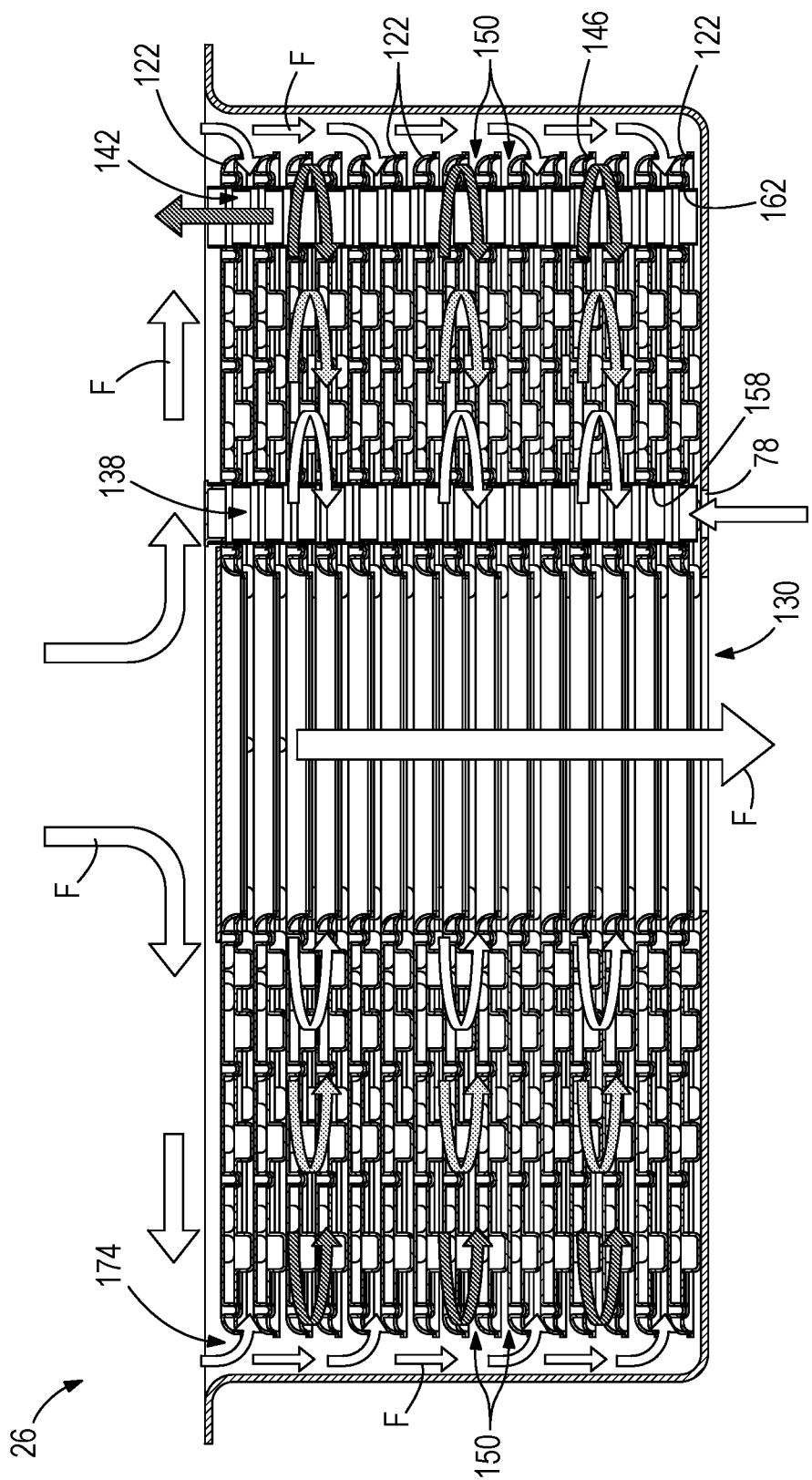
FIG. 9 is a side cross-sectional view of the secondary heat exchanger taken long line 9-9 in FIG. 7, illustrating a water flow path and a flue gas flow path through the secondary heat exchanger.

With reference to FIGS. 6 and 9, each of the water inlet manifold 138, water outlet manifold 142, and exhaust manifold 130 extends between a bottom plate 122A and a top plate 122B of the plurality of plates 122. Furthermore, the exhaust manifold 130 is in fluid communication with the base 54 and the flue 50 through the bottom plate 122A (FIG. 3). As such, the flue gases F are configured to exit the exhaust manifold 130 through the bottom plate 122A. The water inlet manifold 138 is in fluid communication with the cold water inlet 78 through the bottom plate 122A (FIG. 2). As such, the water is configured to enter the inlet manifold 138 through the bottom plate 122A. The water outlet manifold 142 is in fluid communication with the primary water inlet 98 via the intermediate tube 96 through the top plate 122B (FIGS. 1 and 2). As such, the water is configured to exit the water outlet manifold 142 to the intermediate tube 96 (and subsequently the primary heat exchanger 22) through the top plate 122B.

Figure 11A:
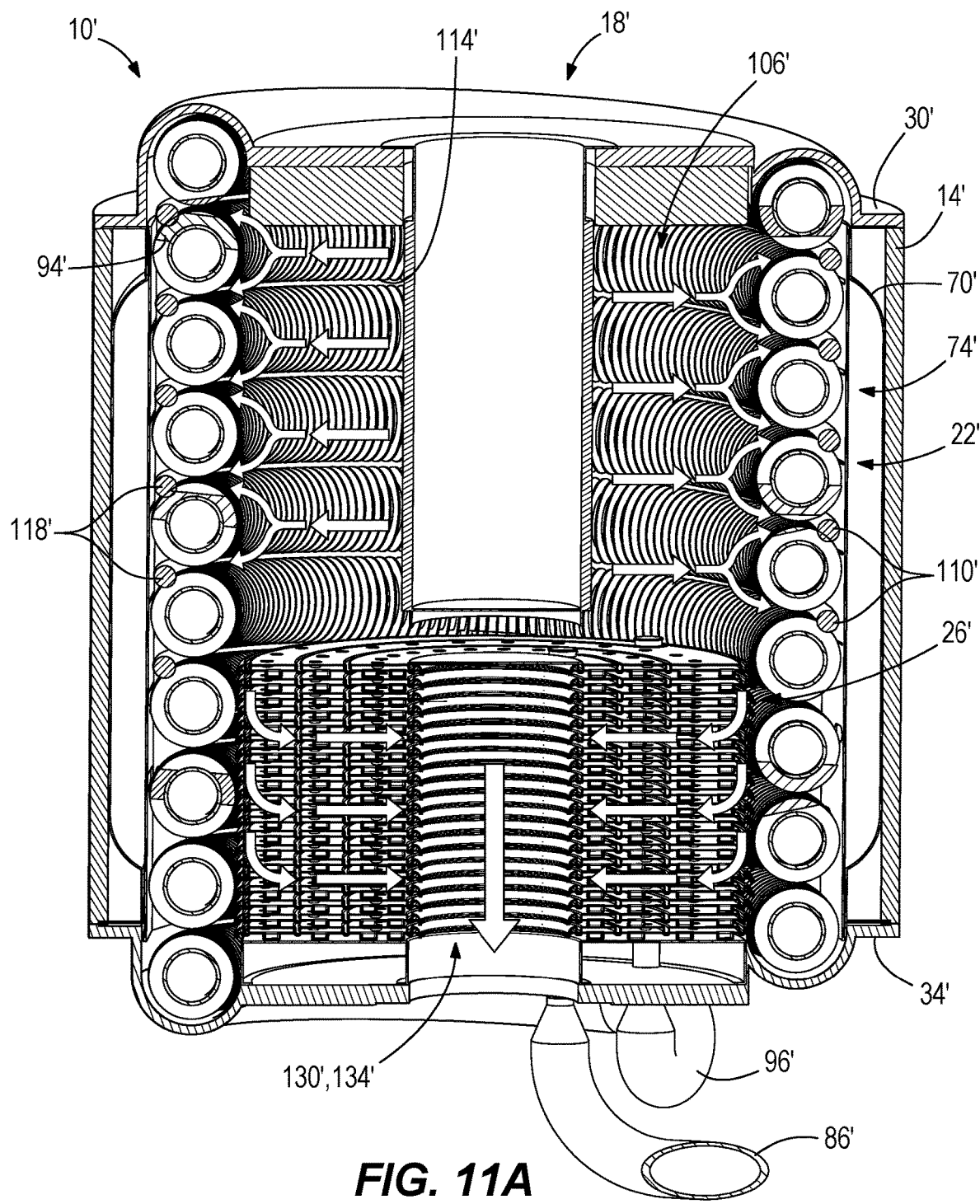
FIG. 11A is a side cross-sectional view taken along line 11A-11A in FIG. 10, illustrating a primary heat exchanger and a secondary heat exchanger positioned within the primary heat exchanger.

With reference to FIGS. 3 and 9, the top plate 122B is configured to inhibit or block the flue gases F from entering the secondary heat exchanger 26 through the exhaust manifold 130 from the primary heat exchanger 22. As such, the flue gases F are directed to the outer edge 146 of the top plate 122B within the primary heat exchanger 22 before entering the secondary heat exchanger 26. In other embodiments, as shown in FIG. 11A, the flue gases F may flow directly from the primary heat exchanger 22 into the secondary heat exchanger 26.

The following paragraphs describe the structure of the secondary heat exchanger 26 that guides the water and the flue gases F between the plates 122 of the secondary heat exchanger 26.

Figure 8B:
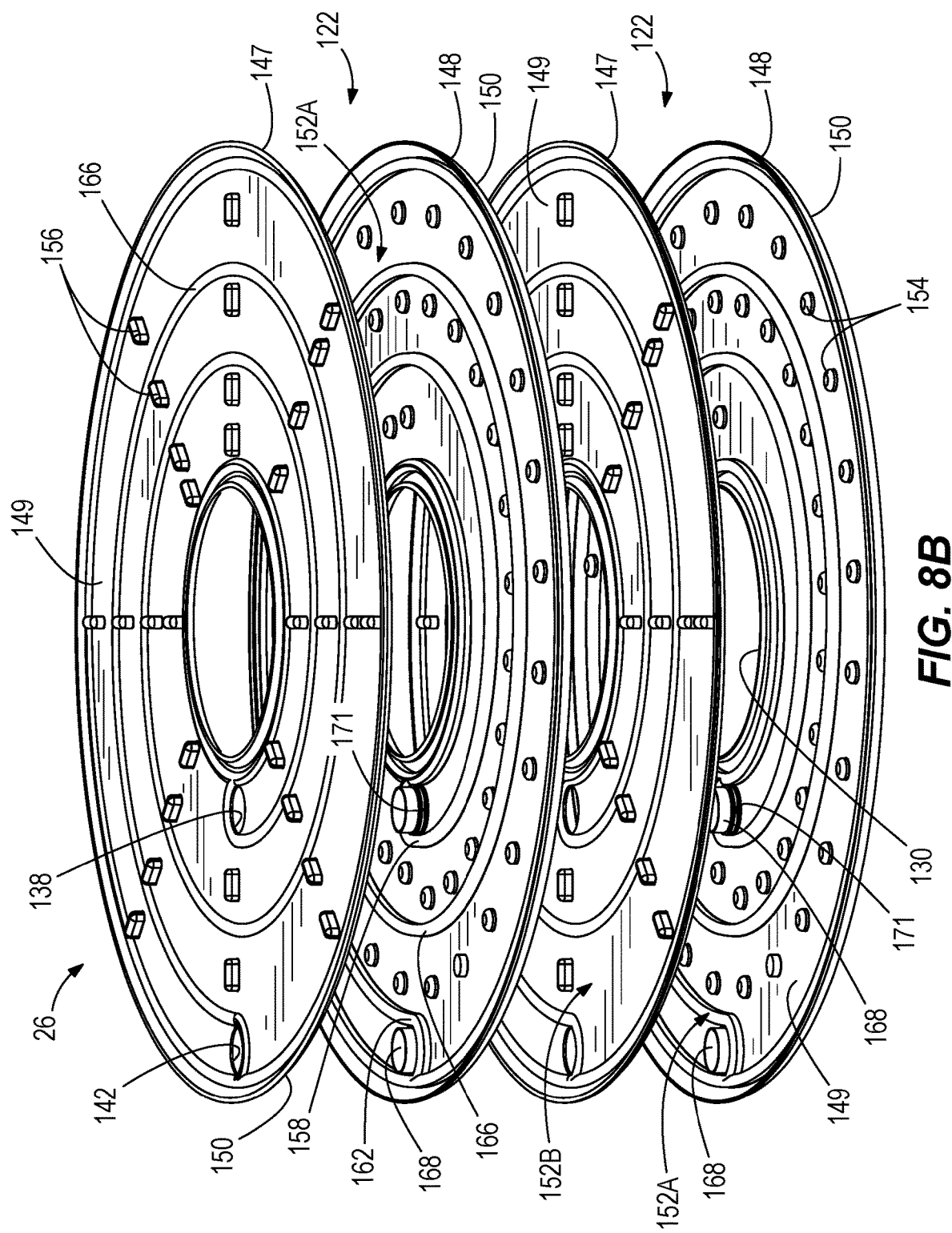
FIG. 8B is a top perspective exploded view of the plurality of plates of FIG. 8A positioned up-side-down, illustrating a bottom side of each of the plates.

With particular reference to FIGS. 8A-8B, each of the plates 122 of the secondary heat exchanger 26 is formed by a set of plate portions 147, 148. In the illustrated embodiment, each set includes a lower plate portion 147 and an upper plate portion 148. Each plate portion 147, 148 includes a bottom side 149 and a top side 150 opposite the bottom side 149. In the illustrated embodiment, the secondary heat exchanger 26 includes fifteen sets of plates 122; however, in other embodiments, the secondary heat exchanger 26 may include more or less than fifteen sets of plates 122. For example, as shown in FIG. 11A, the secondary heat exchanger 26 includes twenty sets of plates 122.

With reference to FIGS. 6, 8A-8B, and 9, the secondary heat exchanger 26 includes a plurality of passages 152A, 152B defined between the bottom side 149 and the top side 150 of the lower and upper plate portions 147, 148. For example, as shown in FIG. 8A, passage 152A is defined by the bottom side 149 of the upper plate portion 148 and the top side 150 of the adjacent lower plate portion 147. In another example, passage 152B is defined by the bottom side 149 of the lower plate portion 147 and the top side 150 of the adjacent upper plate portion 148. Furthermore, the secondary heat exchanger 26 includes a first set of passages including all of the passages 152A that are defined by the bottom side 149 of the upper plate portion 148 and the top side 150 of the adjacent lower plate portion 14. The secondary heat exchanger 26 further includes a second set of passages including all of the passages 152B that are defined by the bottom side 149 of the lower plate portion 147 and the top side 150 of the adjacent upper plate portion 148. The first set of passages 152A alternate with the second set of passages 152B in the axial direction. The first set of passages 152A is configured to receive the water. The second set of passages 152B is configured to receive the flue gases F. In the illustrated embodiment, each of the illustrated passages 152A, 152B has an annular shape defined between the plate portions 147, 148.

With reference to FIGS. 8A-8B, the lower and upper plate portions 147, 148 include coupling members 154, 156, 166. The coupling members 154, 156, 166 are positioned in a pattern on each plate portion 147, 148. In addition, the coupling members 154, 156, 166 extend into the passages 152A, 152B along the axial direction. The illustrated coupling members 154, 156, 166 are formed by stamping—the coupling members 154, 156, 166 may be circular, rectangular, or any other shape that can be stamped. In other embodiments, the coupling members 154, 156 166 may be formed by other manufacturing methods known to one skilled in the art to form the coupling members 154, 156, 166. The coupling members 154, 156, 166 are configured to facilitate the securing of the plate portions 147, 148 together.

In the illustrated embodiment, as shown in FIGS. 8A and 8B, the upper plate portion 148 includes a plurality of coupling members 154. Each coupling member 154 is defined as a recess on the top side 150 and a corresponding detent on the bottom side 149. As such, the top side 150 of each upper plate portion 148 may be termed as the recess side, and the bottom side 149 may be termed as the detent side. In other words, these recesses and corresponding detents form each of the coupling members 154. In particular, the detents extend from the bottom side 149 toward the top side 150 of the adjacent lower plate portion 147. The detents of the coupling members 154 are positioned in the first set of passages 152A.

The lower plate portion 147 includes a plurality of coupling members 156. Similar to the coupling members 154, each coupling member 156 is defined as a recess on the top side 150 and a corresponding detent on the bottom side 149. As such, the top side 150 of each lower plate portion 148 may also be termed as the recess side, and the bottom side 149 may be termed as the detent side. In particular, the detents extend from the bottom side 149 toward the top side 150 of the adjacent upper plate portion 148. The detents of the coupling members 156 are positioned in the second set of passages 152B. In the illustrated embodiment, each of the coupling members 154 has a circular shape, and each of the coupling members 156 has a cylindrical shape. In other embodiments, the coupling members 154, 156 may have the same or different shapes.

The detents of the coupling members 154, 156 extending from the detent side are secured (such as by brazing) to the recess side of the respective adjacent plate portion 147, 148 during manufacturing of the secondary heat exchanger 26. For example, the detent side 149 of the upper plate portion 158 is secured to the recess side 150 of the adjacent lower plate portion 147. As such, as shown in FIG. 9, the detents of each plate portion 147, 148 meets or joins up to each respective adjacent plate portion 147, 148 (except the lower plate portion 147 of the bottom plate 122A). The coupling members 154, 156 are configured to provide rigidity to the secondary heat exchanger 26. In other embodiments, the recess side of each of the coupling members 154, 156 may be positioned in the same set of passages 152A, 152B such that the respective recess side of each coupling member 156, 156 is secured together.

Each lower and upper plate portion 147, 148 further includes a second, spiral-shaped coupling member 166. Similar to the coupling members 154, 156, each coupling member 166 is defined as a recess on the top side 150 and a corresponding detent on the bottom side 149. The detent extends from the bottom side 149 toward the top side 150 of the adjacent plate portion 147, 148.

Figure 7:
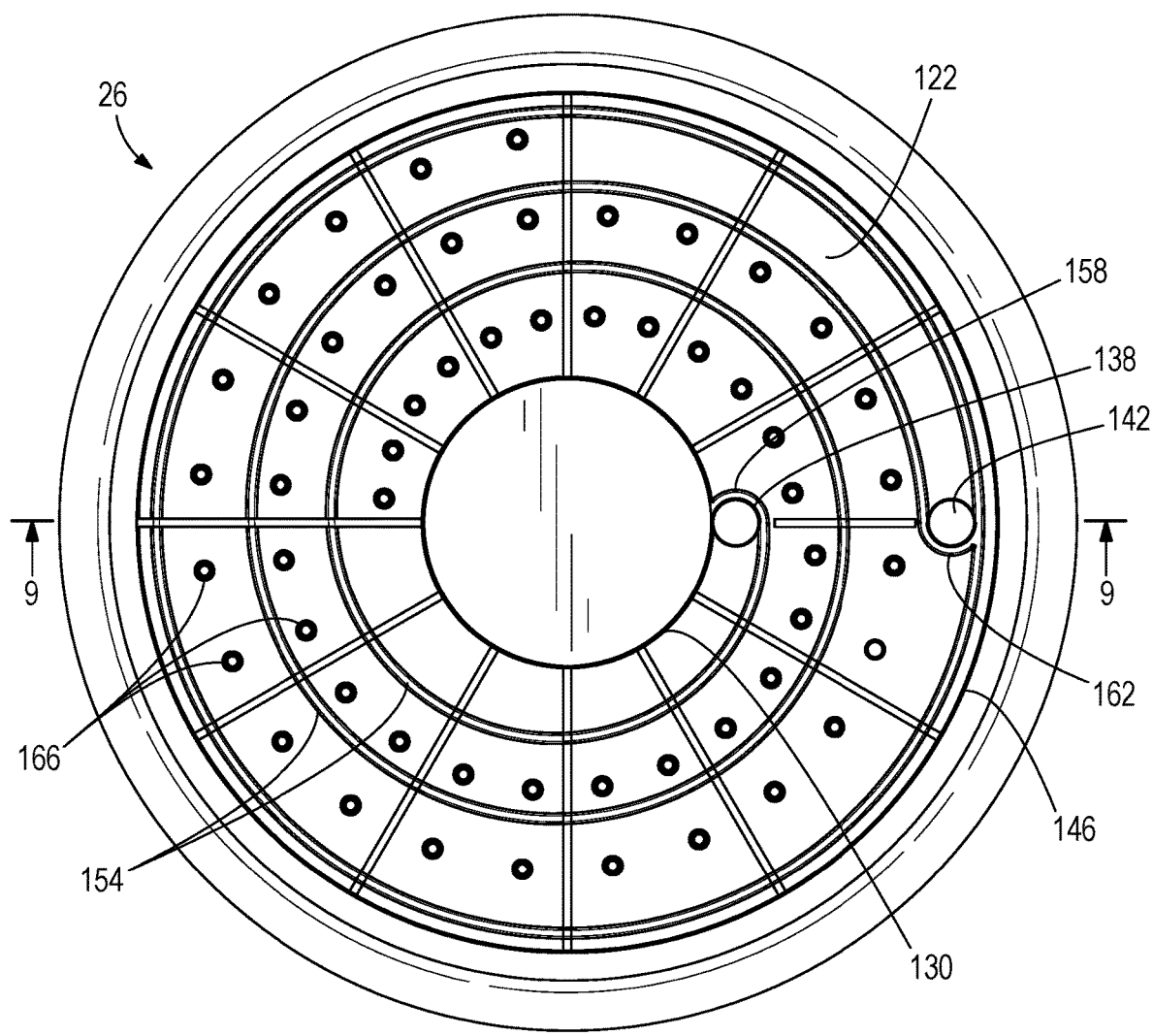
FIG. 7 is a top view of the secondary heat exchanger of FIG. 5.

With reference to FIG. 7, each of the coupling members 166 has the spiral shape that curves or spirals from an inner end 158 to an outer end 162 of the respective plate portion 147, 148. The illustrated inner end 158 is positioned adjacent, but separate from, the exhaust manifold 130. The illustrated outer end 162 is positioned adjacent, but separate from, the outer edge 146 of each plate 122. The inlet manifold 138 is positioned at the inner end 158, and the outlet manifold 142 is positioned at the outer end 162. In other embodiments, the position of the inlet and outlet manifolds 138, 142 may be switched.

With reference to FIGS. 8B and 9, the spiraling coupling member 166 of each of the upper plate portions 148 is positioned in the respective first set of passages 152A and extends in the axial direction between the bottom side 149 of the upper plate portion 148 and the top side 150 of the lower plate portion 147. The coupling member 166 forms a spiral flow path within each of the first set of passages 152A from the inlet manifold 138 to the outlet manifold 142. As such, the coupling member 166 is configured to direct the water along the spiral flow path from the inlet manifold 138 to the outlet manifold 142 between the respective plate portions 147, 148 defining the first set of passages 152A. In the illustrated embodiment, the water is configured to spiral outward from the inner end 158 to the outer end 162 of the plates 122. In other embodiments, the water may spiral inward from the outer end 162 to the inner end 158. Still further, in other embodiments, the flow of the water entering the secondary heat exchanger 26 may be divided or split (i.e., into two or more flow paths) at the inlet manifold 138 such that the water is configured to flow through only a portion of the spiral flow path. For example, the inlet manifold 138 may be split into two flow paths such that a portion of the water travels around a first half of the spiral flow path and another portion of the water travels around a second half of the spiral flow path. In this example, the portions of water converge again at the outlet manifold 142.

The spiraling coupling member 166 of each of the lower plate portions 147 is positioned in the respective second set of passages 152B and extends only partially in the axial direction from the bottom side 149 of the lower plate portion 147 toward the top side 150 of the upper plate portion 148. As such, the flue gases F are not directed along a spiral flow path but may flow freely within the second set of passages 152B. In other embodiments, the coupling member 166 of the lower plate portion 147 may axially extend completely between the upper and lower plate portions 147, 148 such that the flue gases F are directed along the spiral flow path within the second set of passages 152B. Alternatively, in further other embodiments, the upper plate portion 148 may only include the coupling member 166.

The detent of the coupling member 166 of the upper plate portion 148 (i.e., the detent side) is received within the recess formed by the coupling member 166 of the lower plate portion 148 (i.e., the recess side). This may further facilitate securing of the lower and upper plate portions 147, 148, provide rigidity to the secondary heat exchanger 26, and/or inhibit leakage of the water and the flue gases F between the lower and upper plate portions 147, 148. Furthermore, as shown in FIGS. 8A and 8B, the bottom side 149 of each upper plate portion 148 includes a protrusion 168 surrounding each respective hole wherein the inlet manifold 138 and the outlet manifold 142 are each defined by the plates 122. Similarly, the top side 150 of each upper plate portion 148 includes another protrusion 170 surrounding each respective hole for the inlet and outlet manifolds 138, 142.

The protrusions 168, 170 extend between the respective plate portions 147, 148. For example, as shown in FIG. 8A, the protrusion 170 extends from the top side 150 of the upper plate portion 148 toward the bottom side of the adjacent lower plate portion 147. As shown in FIG. 8B, the protrusion 168 extends from the bottom side 149 of the upper plate portion 148 toward the top side 150 of the adjacent lower plate portion 147. As such, the protrusions 168 are positioned in the first set of passages 152A and the protrusions 170 are positioned in the second set of passages 152B. The protrusions 168 may further extend through the hole of the adjacent lower plate portion 147 and received in the respective adjacent protrusion 170 such that the protrusion 168, 170 fluidly connect to form the inlet and outlet manifolds 138, 142. Specifically, the protrusions 168 inhibit the leakage of water from the first set of passages 152A into the second set of passages 152B which receive the flue gases F. Additionally, the protrusions 168 include openings 171 (FIG. 8B) for water to enter and exit the first set of passages 152A such that the protrusions 168 fluidly connect the first set of passages 152A between the plate portions 147, 148 to the inlet and outlet manifolds 138, 142. Further, the protrusions 168, 170 are secured together and/or to the respective lower and upper plate portions 147, 148 such that the protrusions 168, 170 facilitate coupling of the plates 122 together.

With reference to FIGS. 6 and 9, the first set of passages 152A is in fluid communication with the inlet and outlet manifolds 138, 142. Specifically, the water is configured to enter the secondary heat exchanger 26 through the cold water inlet 78 into the inlet manifold 138. Subsequently, the water is configured to move from the inlet manifold 138 along the passages of the first set of passages 152A to the outlet manifold 142. The water is then directed from the outlet manifold 142 to the primary heater exchanger 22 by the intermediate tube 96 through the top plate 122B. As such, the water is directed first through the secondary heat exchanger 26 and then through the primary heat exchanger 22.

With reference to FIGS. 3 and 9, the second set of passages 152B is in fluid communication with the exhaust manifold 130 and the primary cavity 106 of the primary heat exchanger 22, 22A. In particular, the flue gases F are directed in a radial direction perpendicular to the axial direction through the primary heat exchanger 22 (i.e., from the combustor 42 through the primary cavity 106 past the tube(s) 94, 94A toward the outer casing 14). Then the flues gases F are directed axially downward from the primary heat exchanger 22 to the secondary heat exchanger 26. Subsequently, the flue gases F are directed radially through the second set of passages 152B to the exhaust manifold 130. The flue gases F are then directed from the exhaust manifold 130 through the base 54 to the flue 50 and subsequently to the outside atmosphere. As such, the flue gases F are directed first through the primary heat exchanger 22 and then through the secondary heat exchanger 26.

With reference to FIGS. 1 and 3, the fan (not shown) of the fan housing 46 is configured to direct the flue gases F through the primary and secondary heat exchangers 22, 26 before directing the flue gases F through the exhaust 66.

As will be described in more detail below, the lower and upper plate portions 147, 148 may form a funnel to accommodate condensation within the secondary heat exchanger 26 (i.e., the second set of passages 152B). Specifically, each of the plate portions 147, 148 may be formed to slant slightly downward relative to the longitudinal axis 38 during the stamping process. As such, both the flue gases F and the water flowing through the passages 150 flow over the slanted surfaces of the plates 122. More specifically, the condensed water or condensate that may form in the second set of passages 152B may be directed toward the exhaust manifold 130 by the slanted surfaces. The base 54 may include a condensate drain (not shown) in fluid communication with the exhaust manifold 130 such that the condensate is directed from the second set of passages 152B through the exhaust manifold 130 where it may then escape the water heater 10 out the condensate drain.

In another embodiment, if the lower and upper plate portions 147, 148 are in a flat orientation relative to the longitudinal axis 38, the coupling members 166 of the upper plate portions of 147, 148 may terminate at an open channel (not shown) positioned proximate to the exhaust manifold 130. Any condensate formed in the second set of passages 152B may be collected in the coupling members 166, and then directed toward the exhaust manifold 130 by the coupling members 166. Subsequently, the condensate may exit the second set of passages 152B, and may flow down through the channel to the base 54 and out to the condensate drain.

In one embodiment, as shown in FIGS. 1-9, the secondary heat exchanger 26 is positioned axially below the primary heat exchanger 22 relative to the longitudinal axis 38. In other words, the plates 122 are axially below the tube(s) 94. Furthermore, the secondary heat exchanger 26 is positioned within a can or a second housing 182 (FIG. 6), and the second housing 182 is positioned within the outer casing 14 of the water heater 10, and within the housing 70. In particular, the second housing 182 is positioned in the lower portion 126 of the interior space 74. An annular gap 174 (FIGS. 3 and 6) is defined between an outer wall 178 of the second housing 182 and the outer edges 146 of the plates 122. The gap 174 is in fluid communication with the primary heat exchanger 22 such that the flue gases F are directed along the gap 174 from the primary heat exchanger 22 before entering the second set of passages.

Figure 10:
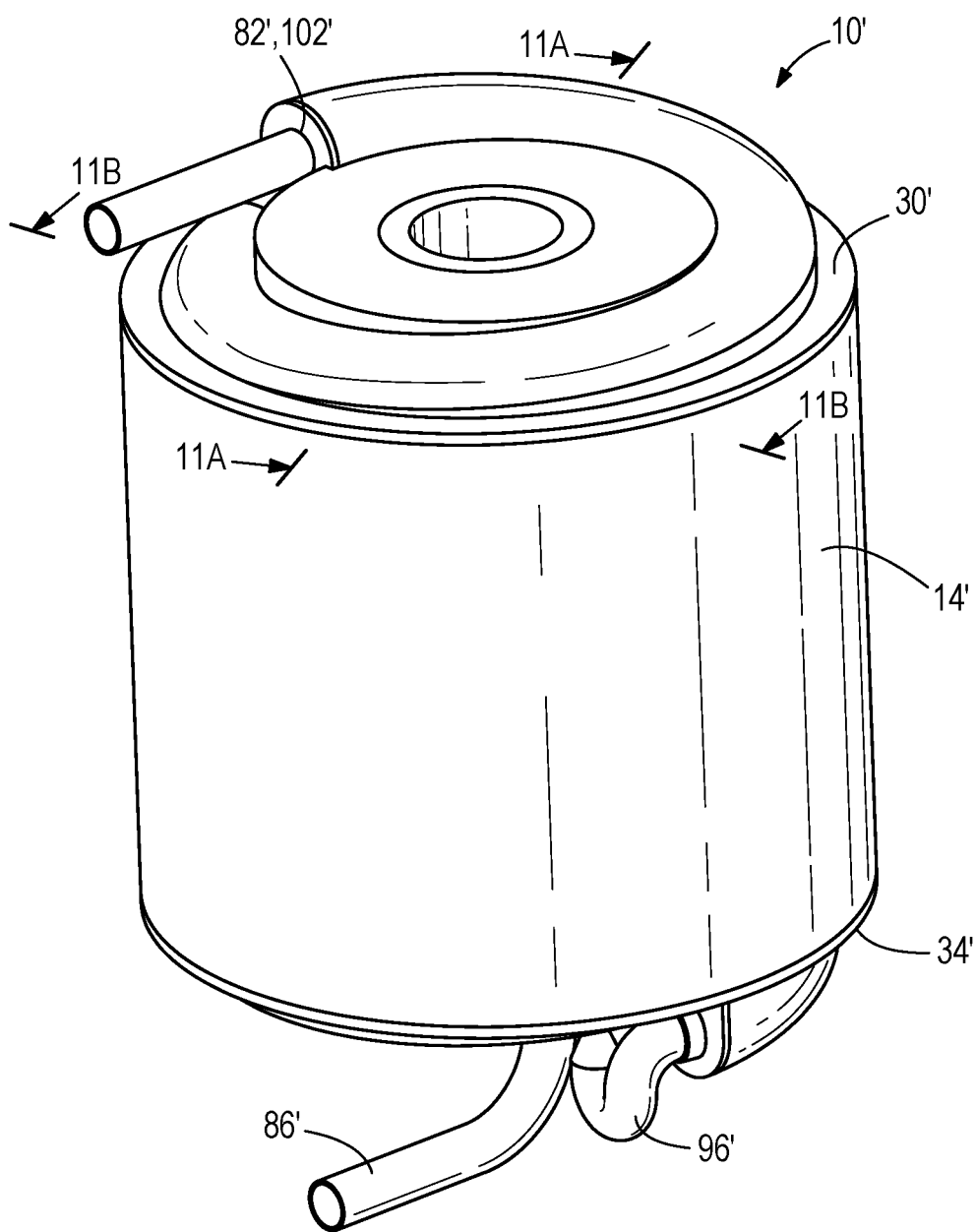
FIG. 10 is a perspective view of another water heater embodying the invention.
Figure 11B:
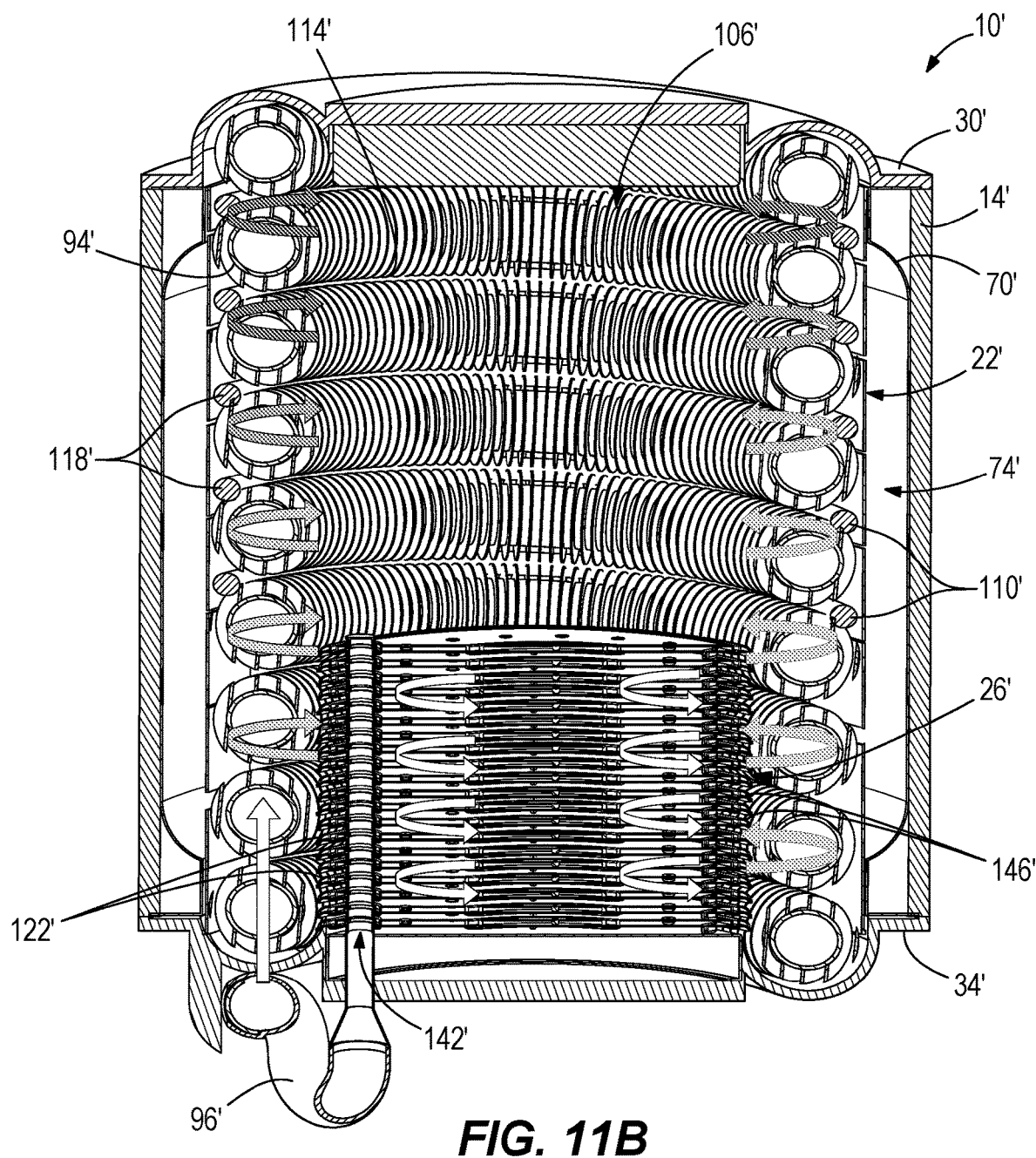
FIG. 11B is a side cross-sectional view taken along line 11B-11B in FIG. 10.

FIGS. 10-11B illustrate another water heater 10' embodying the invention. In this alternative embodiment, like elements as the first embodiment (FIGS. 1-9) have been given the same reference numbers plus a prime (') symbol. Specifically, in this alternative embodiment, the secondary heat exchanger 26' is positioned within the primary heat exchanger 22' (i.e., there is no can or second housing 182). In other words, the plates 122' are positioned radially inward of the tube(s) 94' such that a lower portion of the tube(s) 94' also coils about the plates 122'. As such, the secondary heat exchanger 26' may be positioned within the primary cavity 106' of the primary heat exchanger 22'. Therefore, the primary cavity 106' of the primary heat exchanger 22' extends through both the upper portion 90' and the lower portion 126' of the interior space 74' defined by the outer casing 14'. Furthermore, the intermediate tube 96' is in fluid communication with the outlet manifold 142' through the bottom plate 122A' (instead of the top plate 122B' as in the first embodiment). As such, in this configuration, the water heater 10' may be more compact. In some embodiments, a plate member (not shown) may be positioned on top of the secondary heat exchanger 26' to facilitate the flow of flue gases F between the tube(s) 94' of the primary heat exchanger 22' before flowing to the secondary heat exchanger 26'.

Figure 14:
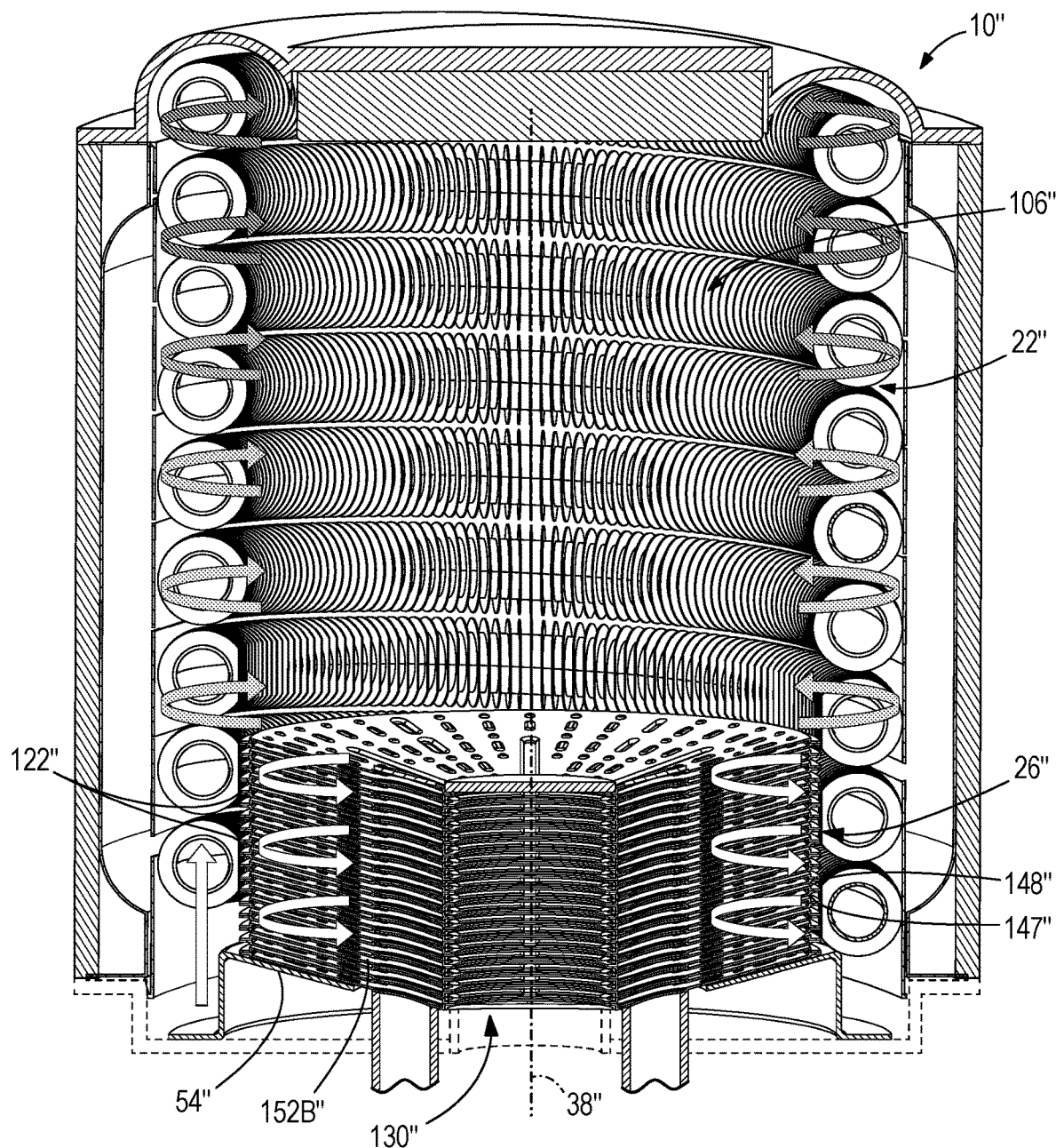
FIG. 14 is a cross-sectional view of an alternative construction of the primary and secondary heat exchangers.
Figure 15:
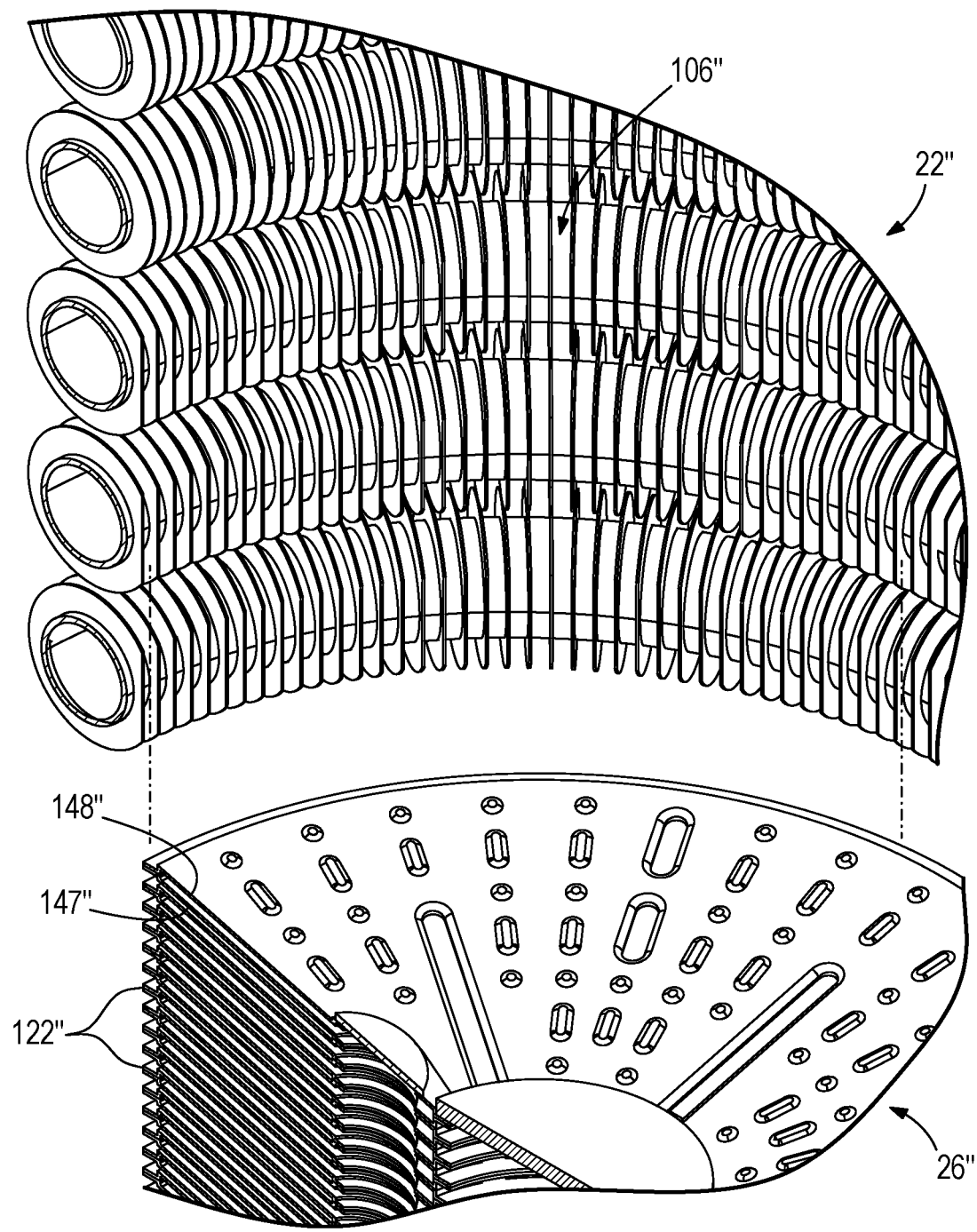
FIG. 15 is an exploded view of the primary and secondary heat exchangers of FIG. 14.

FIGS. 14-15 illustrate an alternative construction of a water heater 10" embodying the invention. In this alternative embodiment, like elements as the first and second embodiments have been given the same reference numbers plus a double prime (") symbol. As illustrated in FIG. 14, the secondary heat exchanger 26" nests inside the lower portion of the primary heat exchanger 22" similar to the embodiment of FIGS. 10-11B. In this embodiment, however, both the primary heat exchanger 22" and the secondary heat exchanger 26" have been modified.

The primary heat exchanger 22" is modified in this embodiment by squaring the external heat exchange fins facing radially inwardly around the secondary heat exchanger 26" (i.e., the radially-inwardly-facing portions of the bottom two or three turns of the coil). The squared fins together define or provide a cylindrical cavity that closely fits around the secondary heat exchanger 26". As such, the outer edges of the plates 122" of the secondary heat exchanger 26" fit very closely to or in contact with a relatively large surface area of the fins of the primary heat exchanger 22". This relatively tight fit of the secondary heat exchanger 26" within the primary cavity 106" of the primary heat exchanger 22" promotes the flow of combustion products into the secondary heat exchanger 26" and reduces the bypass flow of products of combustion around the outside of the secondary heat exchanger 26".

The secondary heat exchanger 26" is modified as alluded to above, with the lower and upper plate portions 147", 148" forming a funnel to collect condensation within the secondary heat exchanger 26". Specifically, each of the plate portions 147", 148" is slanted radially from all sides slightly downward relative to the longitudinal axis 38" toward the center during the stamping process. Flue gases F and condensate that may form in the second set of passages 152B" are directed toward the exhaust manifold 130" by the slanted surfaces. The base 54" includes a condensate drain (not shown) in fluid communication with the exhaust manifold 130" such that the condensate is directed from the second set of passages 152B" through the exhaust manifold 130" where it may then escape the water heater 10" out the condensate drain.

The water heater 10 may further include a pump or valve in connection with the tube(s) 94 of the primary heat exchanger 22. Specifically, scale may build up within the tube(s) 94. The tube(s) 94 is freely moving within the interior space 74 such that the scale is configured to detach from the tube(s) 94. The pump or valve may be operated to divert water flow through the primary heat exchanger 22 or both the primary and secondary heat exchangers 22, 26 for flushing any scale that is caught within the tube(s) 94, or other downstream components. As such, the water heater 10 includes a self-flushing feature for reducing scale build up. The single tube(s) design and other features such as formed fittings at the primary water inlet 98 and the primary water outlet 102 of the tube(s) 94 may also further reduce scale build up.

The water heater 10 may further include a controller for controlling operation of the pump or valve. The controller may also be used to control operation of the combustor 42 and/or flow control valves of the primary heat exchanger 22. A separate controller may also be provided for these functions.

During a performance draw (e.g., the user turns on the faucet), as shown in FIGS. 2 and 11B, the cold water from the cold water source flows through the cold water pipe 86 through the cold water inlet 78 and into the inlet manifold 138. The cold water then spirals outward along the spiral flow path (from the inlet manifold 138 at the inner end 158 to the outlet manifold 142 at the outer end 162; FIG. 9) along the first set of passages 152A. The water then exits the secondary heat exchanger 26 at the outlet manifold 142 to the primary water inlet 98 of the primary heat exchanger 22 via the intermediate tube 96 (FIG. 2). Finally, the water travels through the tube(s) 94 and exits the water heater 10 at the hot water outlet 82 and is delivered to the water delivery point (e.g., the faucet) by the hot water pipe.

Simultaneously, as shown in FIGS. 3 and 11A, the flue gases F, produced by the combustor 42, are directed from the combustor 42 radially outward relative to the longitudinal axis 38 through the primary cavity 106 toward the outer casing 14. Specifically, the flue gases F are directed radially through the gaps 114 defined between adjacent sections of the tube(s) 94 and radially past the baffle 108. The flue gases F near a bottom of the primary cavity 106 are directed to the outer edge 146 of the top plate (FIG. 9), and the flue gases F near the first end 30 of the outer casing 14 travel axially downward relative to the longitudinal axis 38 between the outer casing 14 and an outer circumference of the coiled tube(s) 94. The flue gases F then enter the secondary heat exchanger 26 at the outer edge 146 of the plates 122. The flue gases F travel radially inward relative to the longitudinal axis 38 from the outer edge 146 of the plates 122 along the second set of passages 152B to the exhaust manifold 130. Finally, the flue gases F exit the water heater 10 through the base 54 to the flue 50, and are exhausted to the atmosphere.

In the embodiment of the water heater 10' of FIGS. 9-11B, the flue gases F are directed radially outward past a portion of the adjacent sections of the tube(s) 94 before the flue gases F are directed axially downward toward the secondary heat exchanger 26. Moreover, the flue gases F may be directed radially inward past the remaining adjacent sections of the tube(s) 94 before entering the second set of passages 152B of the secondary heat exchanger 26 (FIG. 11A).

Since the flue gases F flow radially outward over the tube(s) 94 of the primary heat exchanger 22 while water within the tube(s) 94 flows upward along the coiled tube(s) 94, the primary heat exchanger 22 is substantially configured as a cross-counter flow heat exchanger, as best shown in FIGS. 2-3. Moreover, with respect to the secondary heat exchanger 26, since the flue gases F flow radially inward along the second set of passages 152B while the water spirals radially outward along the first set of passages 152A, the secondary heat exchanger 26 is also substantially configured as a cross-counter flow heat exchanger, as best shown in FIG. 9.

As heat is transferred from the flue gases F to the water in the primary and secondary heat exchangers 22, 26, the temperature of the water within the primary and secondary heat exchangers 22, 26 rises while the temperature of the heat exchange surfaces (e.g., of the tube(s) 94, the plates 122, etc.) are cooled. In particular, the flue gases F are hottest in the primary heat exchanger 22 such that the water exiting the water heater 10 from the primary heat exchanger 22 is at the predetermined temperature. In addition, the flue gases F exiting the primary heat exchanger 22 to the secondary heat exchanger 26 are still hot and the remaining heat of the flue gases F is recovered by passing the flue gases F through the secondary heat exchanger 26. The water is the coldest in the secondary heat exchanger 26, thereby creating a large temperature difference between the semi-cooled flue gases F and the water entering the secondary heat exchanger 26 such that most or all of the heat may be extracted from the flue gases F before the flue gases F are exhausted to the atmosphere. This may increase an overall thermal efficiency of the water heater 10. Furthermore, the secondary heat exchanger 26 may be a condenser in which the temperature of the flue gases F is lowered enough such that the condensate forms in the secondary heat exchanger 26.

During standby operation in which hot water is not drawn out of the hot water outlet 82, the water remains in the water heater 10 (i.e., within the primary and secondary heat exchangers 22, 26) until a subsequent performance draw. The combustor 42 is not operated during standby such that the remaining water in the water heater 10 may cool down. Upon the subsequent performance draw, the cooled water is displaced to the water delivery point by the cold water entering the water heater 10. The flue gases F quickly heat the water moving through the water heater 10 such that the water quickly reaches the desired temperature at the water delivery point.

In the illustrated embodiment, the combustor 42, and the primary and secondary heat exchangers 22, 26 are all contained in one module such that the water heater 10 is a self-contained module. In addition, the primary heat exchanger 22 and the secondary heat exchanger 26 are configured within the outer casing 14 such that the outer casing 14 forms a single cylinder that looks like a standard tank-type water heater 10. In alternate embodiments, the secondary heat exchanger 26 may be arranged on top of the primary heat exchanger 22, and the combustor 42 may be arranged below the primary heat exchanger 22 such that the flue gases F flow upwardly within the primary heat exchanger 22.

Water heaters according to the present invention may include improved thermal efficiency over known tank-type water heaters and other instantaneous water heaters. More specifically, the water heater 10 including the brazed plate heat exchanger can operate with an efficiency of 95% or greater. Furthermore, water heaters according to the present invention may be modular (each self-contained module is connected in series). In particular, the modulation can reach up to 40 to 1. Modulation is based on a size of each module, and how many modules are connected together.

Various features and advantages of the invention are set forth in the following claims.

What is claimed is:

1. A water heater comprising:
an outer casing defining a longitudinal axis, an axial direction being defined as extending along the longitudinal axis;
a combustor for production of hot flue gases;
a primary heat exchanger including a tube positioned within the outer casing; and
a secondary heat exchanger including a plurality of plates coupled together by brazing to form a brazed plate heat exchanger, the secondary heat exchanger including a first set of passages defined between the plates and a second set of passages defined between the plates and alternating with the first set of passages in the axial direction;
wherein the primary heat exchanger and the secondary heat exchanger are in fluid communication such that the flue gases flow from the combustor then through the primary heat exchanger and then through the second set of passages before being exhausted, and water to be heated flows through the first set of passages then through the tube and then to a delivery point for use upon demand,
wherein the secondary heat exchanger includes a spiral flow path, and wherein the water is configured to be directed along the spiral flow path,
wherein the spiral flow path is formed by a coupling member extending axially between adjacent plates, and wherein at least one of the passages of the first set of passages includes the coupling member.

2. The water heater of claim 1, wherein the plates define a water outlet manifold, wherein the tube includes a water inlet and a water outlet, and wherein the water inlet is fluidly connected to the water outlet manifold.

3. A water heater comprising:
an outer casing defining a longitudinal axis, an axial direction being defined as extending along the longitudinal axis;
a combustor for production of hot flue gases;
a primary heat exchanger including a tube positioned within the outer casing; and
a secondary heat exchanger including a plurality of plates coupled together by brazing to form a brazed plate heat exchanger, the secondary heat exchanger including a first set of passages defined between the plates and a second set of passages defined between the plates and alternating with the first set of passages in the axial direction;
wherein the primary heat exchanger and the secondary heat exchanger are in fluid communication such that the flue gases flow from the combustor then through the primary heat exchanger and then through the second set of passages before being exhausted, and water to be heated flows through the first set of passages then through the tube and then to a delivery point for use upon demand,
wherein the secondary heat exchanger includes a spiral flow path, and wherein the water is configured to be directed along the spiral flow path, and
wherein the spiral flow path is formed by a coupling member spiraling from a first end to a second end of each plate to form the spiral flow path.

4. The water heater of claim 3, wherein the plates define a water inlet manifold positioned at one of the first end and the second end, wherein the plates define a water outlet manifold positioned at the other of the first end and the second end, and wherein the water is directed from the water inlet manifold along the spiral flow path to the water outlet manifold.

5. The water heater of claim 3, wherein the plates define a water outlet manifold, wherein the tube includes a water inlet and a water outlet, and wherein the water inlet is fluidly connected to the water outlet manifold.

6. A water heater comprising:
an outer casing defining a longitudinal axis, an axial direction being defined as extending along the longitudinal axis;
a combustor for production of hot flue gases;
a primary heat exchanger including a tube positioned within the outer casing; and
a secondary heat exchanger including a plurality of plates coupled together by brazing to form a brazed plate heat exchanger, the secondary heat exchanger including a first set of passages defined between the plates and a second set of passages defined between the plates and alternating with the first set of passages in the axial direction;
wherein the primary heat exchanger and the secondary heat exchanger are in fluid communication such that the flue gases flow from the combustor then through the primary heat exchanger and then through the second set of passages before being exhausted, and water to be heated flows through the first set of passages then through the tube and then to a delivery point for use upon demand,
wherein the plates define an exhaust manifold, and wherein the flue gases flow through the second set of passages in a radial direction perpendicular to the axial direction toward the exhaust manifold.

7. The water heater of claim 6, wherein the plates form a funnel for directing condensation formed within the plates to a condensate drain.

8. The water heater of claim 6, wherein the water and the flue gases flow through the secondary heat exchanger in a cross-counter flow.

9. The water heater of claim 6, further comprising an exhaust in fluid communication with the primary heat exchanger and the secondary heat exchanger, and a fan for directing the flue gases first through the primary heat exchanger and the secondary heat exchanger, and then through the exhaust.

10. The water heater of claim 6, wherein the plates define a water outlet manifold, wherein the tube includes a water inlet and a water outlet, and wherein the water inlet is fluidly connected to the water outlet manifold.

11. A water heater comprising:
an outer casing defining a longitudinal axis, an axial direction being defined as extending along the longitudinal axis;
a combustor for production of hot flue gases;
a primary heat exchanger including a tube positioned within the outer casing; and
a secondary heat exchanger including a plurality of plates coupled together by brazing to form a brazed plate heat exchanger, the secondary heat exchanger including a first set of passages defined between the plates and a second set of passages defined between the plates and alternating with the first set of passages in the axial direction;
wherein the primary heat exchanger and the secondary heat exchanger are in fluid communication such that the flue gases flow from the combustor then through the primary heat exchanger and then through the second set of passages before being exhausted, and water to be heated flows through the first set of passages then through the tube and then to a delivery point for use upon demand,
wherein the tube coils about the longitudinal axis within the outer casing thereby forming a plurality of gaps between adjacent sections of the tube, and wherein the primary heat exchanger includes a conduit within at least one of the gaps.

12. A water heater comprising:
an outer casing defining a longitudinal axis, an axial direction being defined as extending along the longitudinal axis;
a combustor for production of hot flue gases;
a primary heat exchanger including a tube positioned within the outer casing; and
a secondary heat exchanger including a plurality of plates coupled together by brazing to form a brazed plate heat exchanger, the secondary heat exchanger including a first set of passages defined between the plates and a second set of passages defined between the plates and alternating with the first set of passages in the axial direction;
wherein the primary heat exchanger and the secondary heat exchanger are in fluid communication such that the flue gases flow from the combustor then through the primary heat exchanger and then through the second set of passages before being exhausted, and water to be heated flows through the first set of passages then through the tube and then to a delivery point for use upon demand,
wherein the tube coils about the longitudinal axis within the outer casing thereby forming a cavity, and wherein the combustor includes a cylindrical combustion surface, the cylindrical combustion surface positioned within the cavity.

13. A water heater comprising:
an outer casing defining a longitudinal axis, an axial direction being defined as extending along the longitudinal axis;
a combustor for production of hot flue gases;
a primary heat exchanger including a tube positioned within the outer casing; and
a secondary heat exchanger including a plurality of plates coupled together by brazing to form a brazed plate heat exchanger, the secondary heat exchanger including a first set of passages defined between the plates and a second set of passages defined between the plates and alternating with the first set of passages in the axial direction;
wherein the primary heat exchanger and the secondary heat exchanger are in fluid communication such that the flue gases flow from the combustor then through the primary heat exchanger and then through the second set of passages before being exhausted, and water to be heated flows through the first set of passages then through the tube and then to a delivery point for use upon demand,
wherein a portion of the tube of the primary heat exchanger doubles back on itself to define a first coil section and a second coil section that is spaced radially further from the longitudinal axis than the first coil section.

14. A water heater comprising:
an outer casing defining a longitudinal axis, an axial direction being defined as extending along the longitudinal axis;
a combustor for production of hot flue gases;
a primary heat exchanger including a tube positioned within the outer casing; and
a secondary heat exchanger including a plurality of plates coupled together by brazing to form a brazed plate heat exchanger, the secondary heat exchanger including a first set of passages defined between the plates and a second set of passages defined between the plates and alternating with the first set of passages in the axial direction;
wherein the primary heat exchanger and the secondary heat exchanger are in fluid communication such that the flue gases flow from the combustor then through the primary heat exchanger and then through the second set of passages before being exhausted, and water to be heated flows through the first set of passages then through the tube and then to a delivery point for use upon demand,
wherein the secondary heat exchanger is positioned at least partially within the primary heat exchanger such that at least a portion of the tube coils about the plates.

15. The water heater of claim 14, wherein the tube of the primary heat exchanger includes external heat exchange fins and the external heat exchanger fins facing radially inwardly around the secondary heat exchanger are squared to provide a cylindrical cavity to closely fit around the secondary heat exchanger.

16. A method of heating water, comprising:
providing an outer casing and a primary heat exchanger including a tube positioned within the outer casing, wherein the outer casing defines a longitudinal axis, an axial direction being defined as extending along the longitudinal axis;

providing a secondary heat exchanger including a plurality of plates coupled together by brazing to form a brazed plate heat exchanger, the plates defining a first set of passages configured to receive water and a second set of passages configured to receive hot flue gases, the second set of passages alternating with the first set of passages in the axial direction;

producing the hot flue gases;

moving the flue gases first through the primary heat exchanger and then through the second set of passages;

flowing water to be heated first through the first set of passages, then into the tube, and then out of the water heater for use upon demand;

heating the water in the tube as the flue gases flow through the primary heat exchanger; and heating the water flowing along the first set of passages as the flue gases flow along the second set of passages, wherein the first set of passages of the secondary heat exchanger includes a spiral flow path, wherein the water is configured to be directed along the spiral flow path, and wherein the spiral flow path is formed by a coupling member extending axially between at least some of the plates, the coupling member spiraling from a first end to a second end of the at least some of the plates to form the spiral flow path, and wherein the water to be heated flows through the first set of passages from one of the first end and the second end along the spiral flow path to the other of the first end and the second end.

17. The water heater of claim 16, wherein the plates define an inlet manifold positioned at one of the first end and the second end, and wherein the plates define an outlet manifold positioned at the other of the first end and the second end.

18. A method of heating water, comprising:

providing an outer casing and a primary heat exchanger including a tube positioned within the outer casing, wherein the outer casing defines a longitudinal axis, an axial direction being defined as extending along the longitudinal axis;

providing a secondary heat exchanger including a plurality of plates coupled together by brazing to form a brazed plate heat exchanger, the plates defining a first set of passages configured to receive water and a second set of passages configured to receive hot flue gases, the second set of passages alternating with the first set of passages in the axial direction;

producing the hot flue gases;

moving the flue gases first through the primary heat exchanger and then through the second set of passages;

flowing water to be heated first through the first set of passages, then into the tube, and then out of the water heater for use upon demand;

heating the water in the tube as the flue gases flow through the primary heat exchanger; and heating the water flowing along the first set of passages as the flue gases flow along the second set of passages, wherein the plates define an exhaust manifold, wherein the flue gases flow through the second set of passages in a radial direction perpendicular to the axial direction toward the exhaust manifold.

19. A method of heating water, comprising:

providing an outer casing and a primary heat exchanger including a tube positioned within the outer casing, wherein the outer casing defines a longitudinal axis, an axial direction being defined as extending along the longitudinal axis;

providing a secondary heat exchanger including a plurality of plates coupled together by brazing to form a brazed plate heat exchanger, the plates defining a first set of passages configured to receive water and a second set of passages configured to receive hot flue gases, the second set of passages alternating with the first set of passages in the axial direction;

producing the hot flue gases;

moving the flue gases first through the primary heat exchanger and then through the second set of passages;

flowing water to be heated first through the first set of passages, then into the tube, and then out of the water heater for use upon demand;

heating the water in the tube as the flue gases flow through the primary heat exchanger; and heating the water flowing along the first set of passages as the flue gases flow along the second set of passages, further comprising positioning the secondary heat exchanger at least partially within the primary heat exchanger such that at least a portion of the tube coils about the plates.

20. The method of claim 19, further comprising providing external heat exchange fins on the tube of the primary heat exchanger and squaring portions of the external heat exchange fins facing radially inwardly around the secondary heat exchanger to provide a cylindrical cavity to closely fit around the secondary heat exchanger.

21. A heat exchanger comprising:

a plurality of plates stacked on top of each other, the plates defining a longitudinal axis extending through the plates, an axial direction defined as extending along the longitudinal axis, the plates coupled together by brazing to form a brazed plate heat exchanger, an inlet manifold and an outlet manifold defined by the plates, the inlet manifold and the outlet manifold configured to receive a first fluid;

an exhaust manifold defined by the plates, the exhaust manifold configured to receive a second fluid;

a first set of passages defined between the plates, the first set of passages in fluid communication with the inlet and outlet manifolds; and a second set of passages defined between the plates, the second set of passages in fluid communication with the exhaust manifold, wherein the second set of passages alternate with the first set of passages in the axial direction, wherein a spiral flow path is formed by a coupling member extending axially between two adjacent plates, wherein the coupling member is positioned within each of the first set of passages, and wherein the first fluid is directed from the inlet manifold through the first set of passages along the spiral flow path to the outlet manifold as the second fluid is directed through the second set of passages to the exhaust manifold.

* * * * *